(12) United States Patent
Chang et al.

(10) Patent No.: US 12,526,368 B2
(45) Date of Patent: Jan. 13, 2026

(54) LEARNING METHOD FOR INTEGRATED NOISE ECHO CANCELLATION SYSTEM USING CROSS-TOWER NETWORK

(71) Applicant: Industry-University Cooperation Foundation Hanyang University, Seoul (KR)

(72) Inventors: Joon Hyuk Chang, Seoul (KR); Song Kyu Park, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 255 days.

(21) Appl. No.: 18/273,450

(22) PCT Filed: Jan. 21, 2022

(86) PCT No.: PCT/KR2022/001165
§ 371 (c)(1),
(2) Date: Sep. 22, 2023

(87) PCT Pub. No.: WO2022/158913
PCT Pub. Date: Jul. 28, 2022

(65) Prior Publication Data
US 2024/0129410 A1    Apr. 18, 2024

(30) Foreign Application Priority Data

Jan. 21, 2021   (KR) .................. 10-2021-0009001

(51) Int. Cl.
*H04M 9/08*    (2006.01)
*G10L 21/0224*    (2013.01)
*G10L 25/30*    (2013.01)

(52) U.S. Cl.
CPC ......... *H04M 9/082* (2013.01); *G10L 21/0224* (2013.01); *G10L 25/30* (2013.01)

(58) Field of Classification Search
CPC .... H04M 9/082; G10L 21/0224; G10L 25/30; G06N 3/08; G10K 11/175
See application file for complete search history.

(56) References Cited

U.S. PATENT DOCUMENTS 7,440,891 B1 * 10/2008 Shozakai ............... G10L 15/20
704/226
2016/0358602 A1 * 12/2016 Krishnaswamy ....... G10L 15/20
(Continued)

FOREIGN PATENT DOCUMENTS

| KR | 10-1871604 B1 | 6/2018 |
| KR | 10-1988504 B1 | 10/2019 |
| KR | 10-2020-0115107 A | 10/2020 |

OTHER PUBLICATIONS

Hyeji Seo et al., "Integrated acoustic echo and background noise suppression based on stacked deep neural networks", Applied Acoustics, 2018, pp. 194-201, vol. 133, [Retrieved on Apr. 8, 2022], Retrieved from <https://doi.Org/10.1016/j.apacoust.2017.12.031>.
(Continued)

*Primary Examiner* — Akelaw Teshale
(74) *Attorney, Agent, or Firm* — Sughrue Mion, PLLC

(57) ABSTRACT

An integrated noise and echo signal removal device using parallel deep neural network according to an embodiment comprises a microphone encoder that receives a microphone input signal including an echo signal, and a speaker's voice signal, converts the microphone input signal into first input information, and outputs the converted first input information, a far-end signal encoder that receives a far-end signal, converts the far-end signal into second input information, and outputs the converted second input information, a pre-learned second artificial neural network having a third input information, which is the sum of the first input information and the second input information, as input information, and having an estimated echo signal obtained by estimating the
(Continued)

echo signal from the second input information as output information, a pre-learned third artificial neural network having the third input information as input information and having an estimated noise signal obtained by estimating the noise signal from the second input information as output information, a voice signal estimator configured to output an estimated voice signal obtained by estimating the voice information based on the estimated echo signal, the estimated noise echo signal, and the second input information.

6 Claims, 21 Drawing Sheets

(56) References Cited

U.S. PATENT DOCUMENTS

| | | | | |
|---|---|---|---|---|
| 2018/0040333 | A1* | 2/2018 | Wung | G10L 21/0232 |
| 2019/0122685 | A1* | 4/2019 | Defraene | G10L 21/0216 |
| 2019/0222691 | A1* | 7/2019 | Shah | G10L 21/0208 |
| 2020/0105287 | A1* | 4/2020 | Chang | G10L 21/0208 |
| 2020/0312345 | A1* | 10/2020 | Fazeli | H04M 3/082 |
| 2020/0312346 | A1* | 10/2020 | Fazeli | G06N 3/044 |
| 2020/0327887 | A1* | 10/2020 | Malik | G10L 15/20 |
| 2020/0411030 | A1* | 12/2020 | Fazeli | G10L 21/0208 |
| 2021/0020188 | A1* | 1/2021 | Wung | G10L 21/0208 |
| 2022/0093106 | A1* | 3/2022 | Mosayyebpour Kaskari | G06N 3/044 |
| 2022/0293120 | A1* | 9/2022 | Fazeli | H04M 9/08 |
| 2024/0105199 | A1* | 3/2024 | Chang | G10L 19/008 |

OTHER PUBLICATIONS

Hongsheng Chen et al., "Nonlinear Residual Echo Suppression Based on Multi-stream Conv-TasNet", arXiv:2005.07631, 2020, pp. 1-5, [Refrieved on Apr. 8, 2022], Retrieved from <https://arxiv.org/abs/2005.07631>.

International Search Report of PCT/KR2022/001165 dated Apr. 25, 2022 [PCT/ISA/210].

Written Opinion of of PCT/KR2022/001165 dated Apr. 25, 2022 [PCT/ISA/237].

* cited by examiner

[FIG 1]
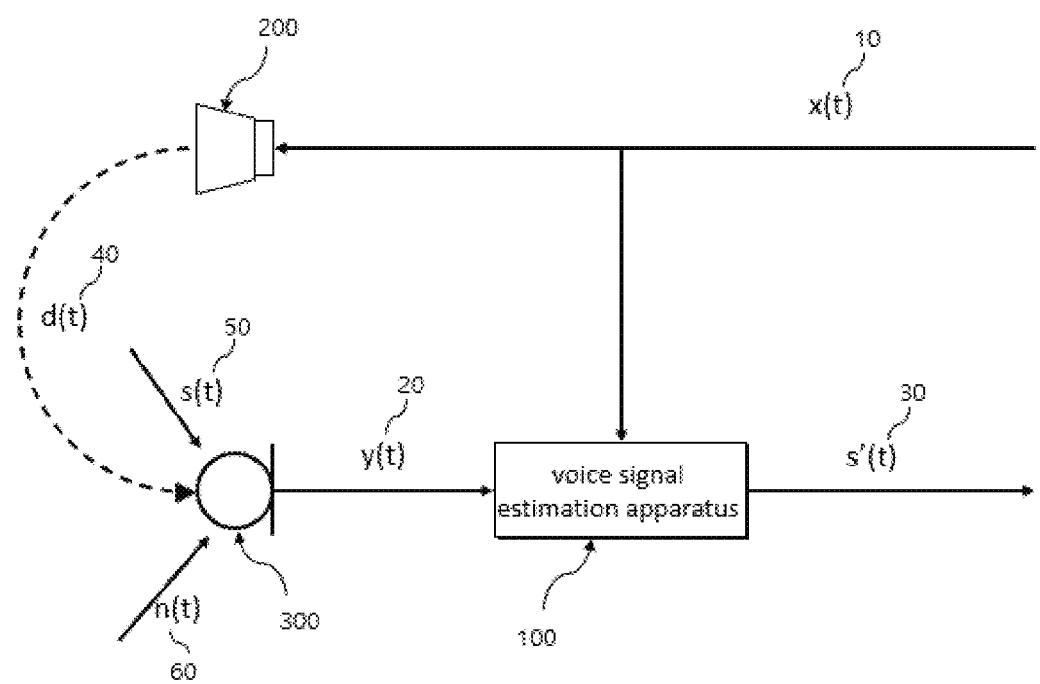

[FIG 2]
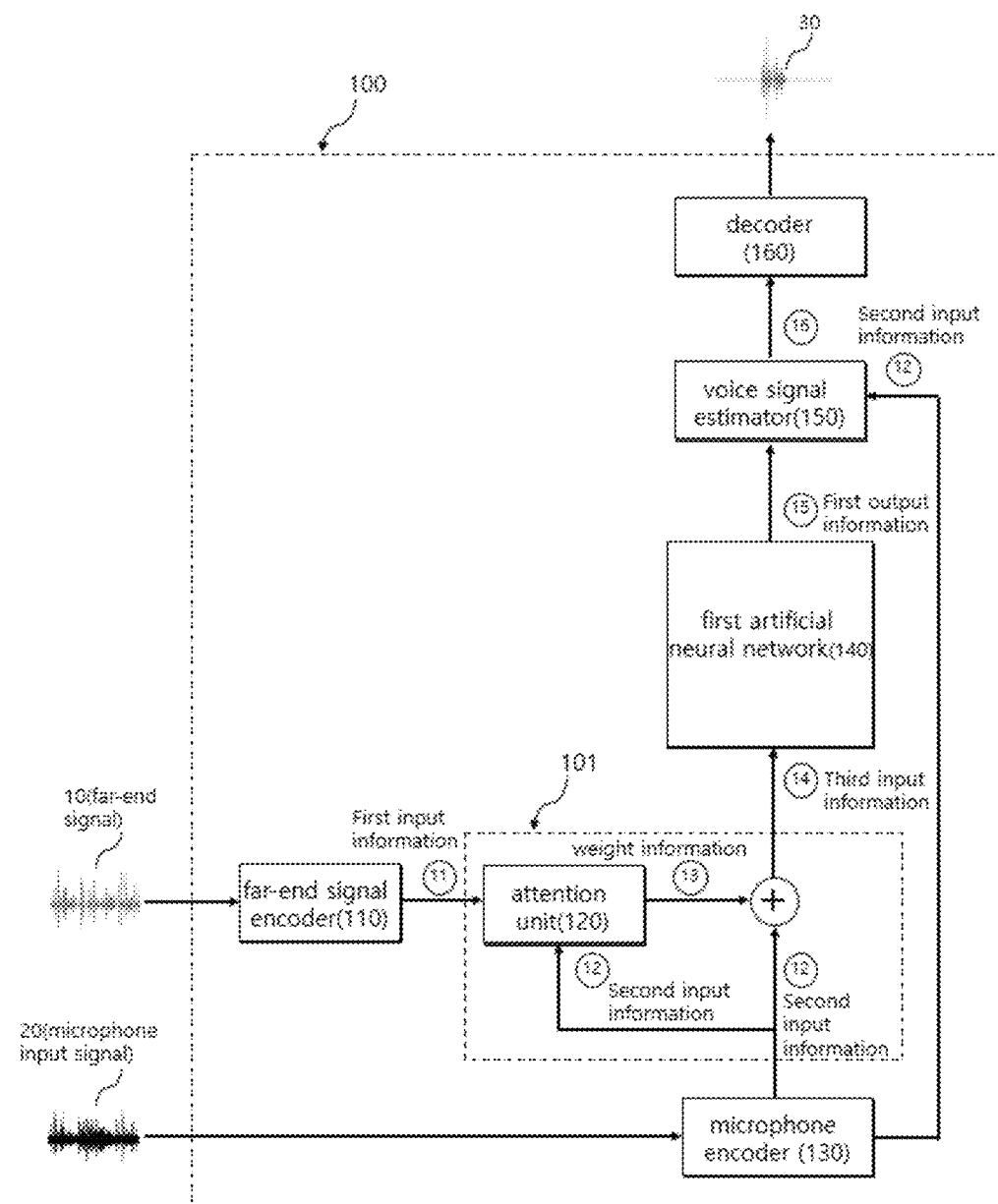

[FIG 3]
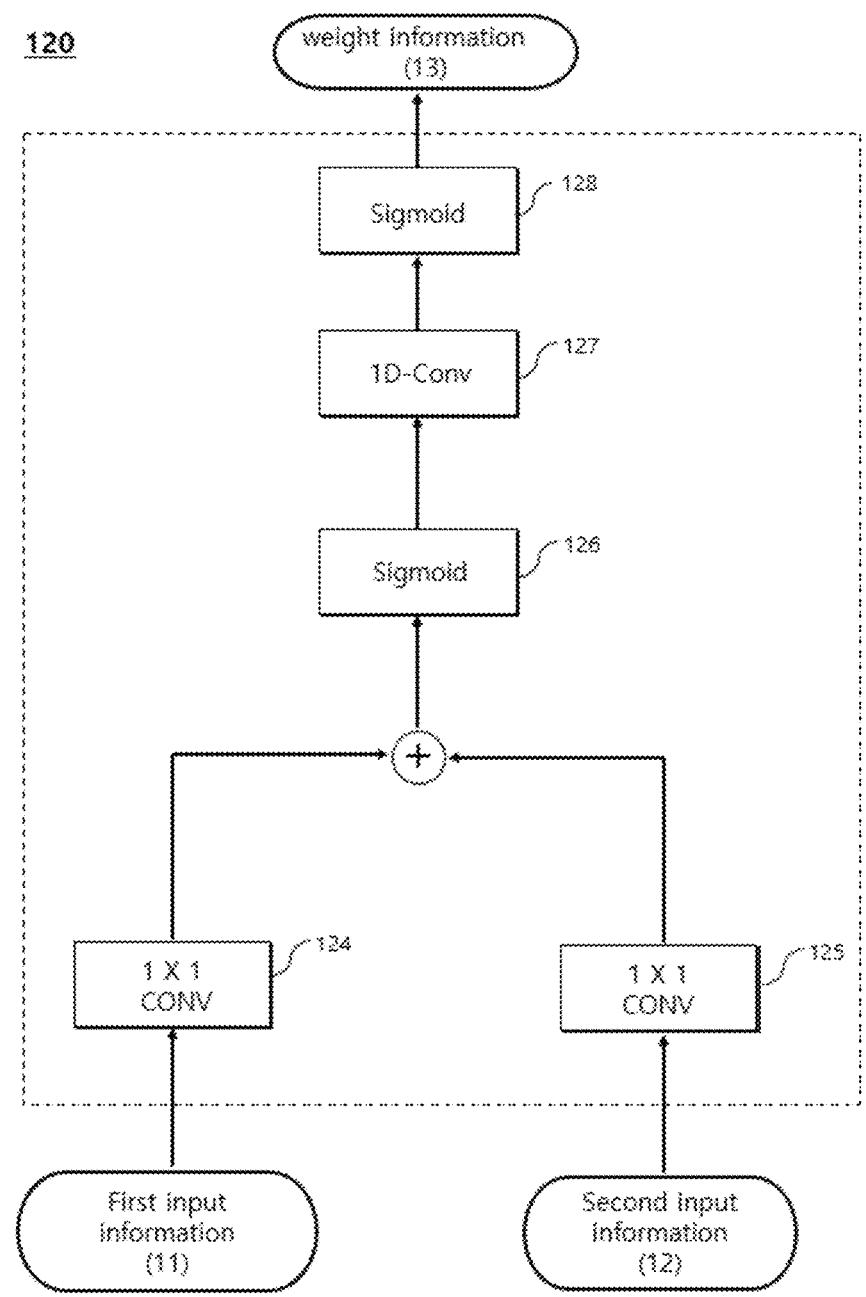

[FIG 4]
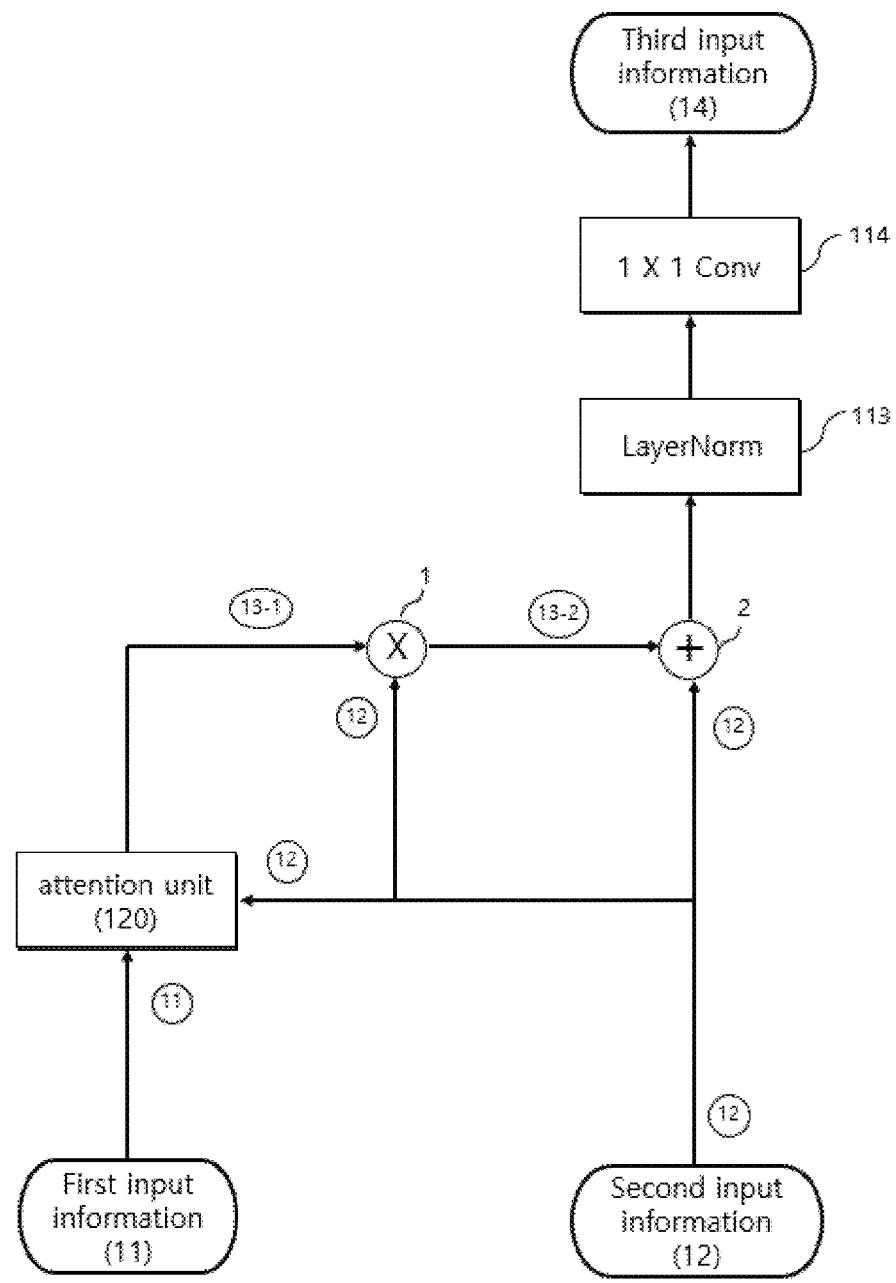

[FIG 5]
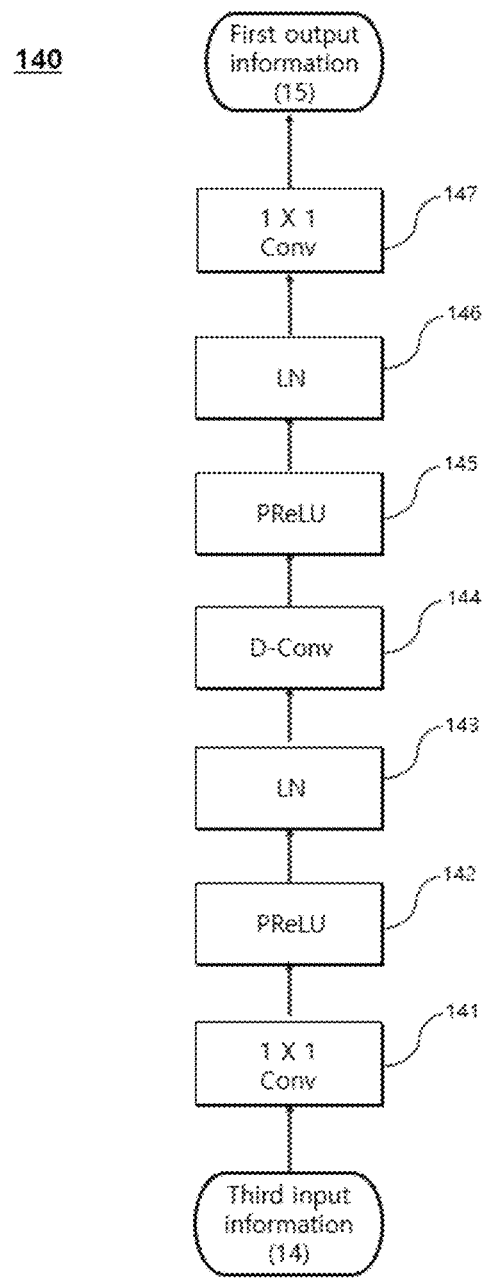

[FIG 6]
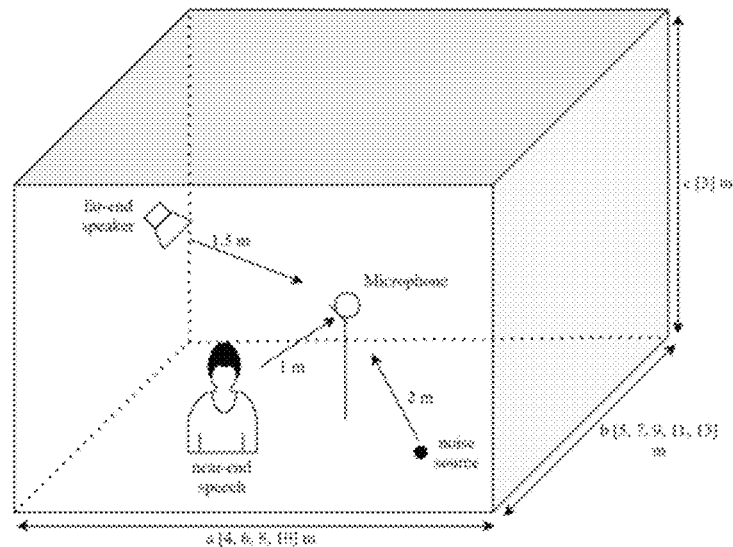

[FIG 7]

| item | channel | model type | PESQ | ERLE | STOI | SDR |
|---|---|---|---|---|---|---|
|  | mic input |  | 1.60 | - | 0.527 | -0.21 |
| 1 | 1 | Stacked-DNN | 1.81 | 24.73 | 0.590 | 4.6 |
| 2 | 1 | CRN | 1.83 | 23.36 | 0.577 | 5.0 |
| 3 | 1 | TCN + Auxiliary network | 1.77 | 28.21 | 0.653 | 7.5 |
| 4 | 1 | TCN + Auxiliary network +attention - First Embodiment | 1.87 | 70.80 | 0.682 | 8.0 |

[FIG 8]
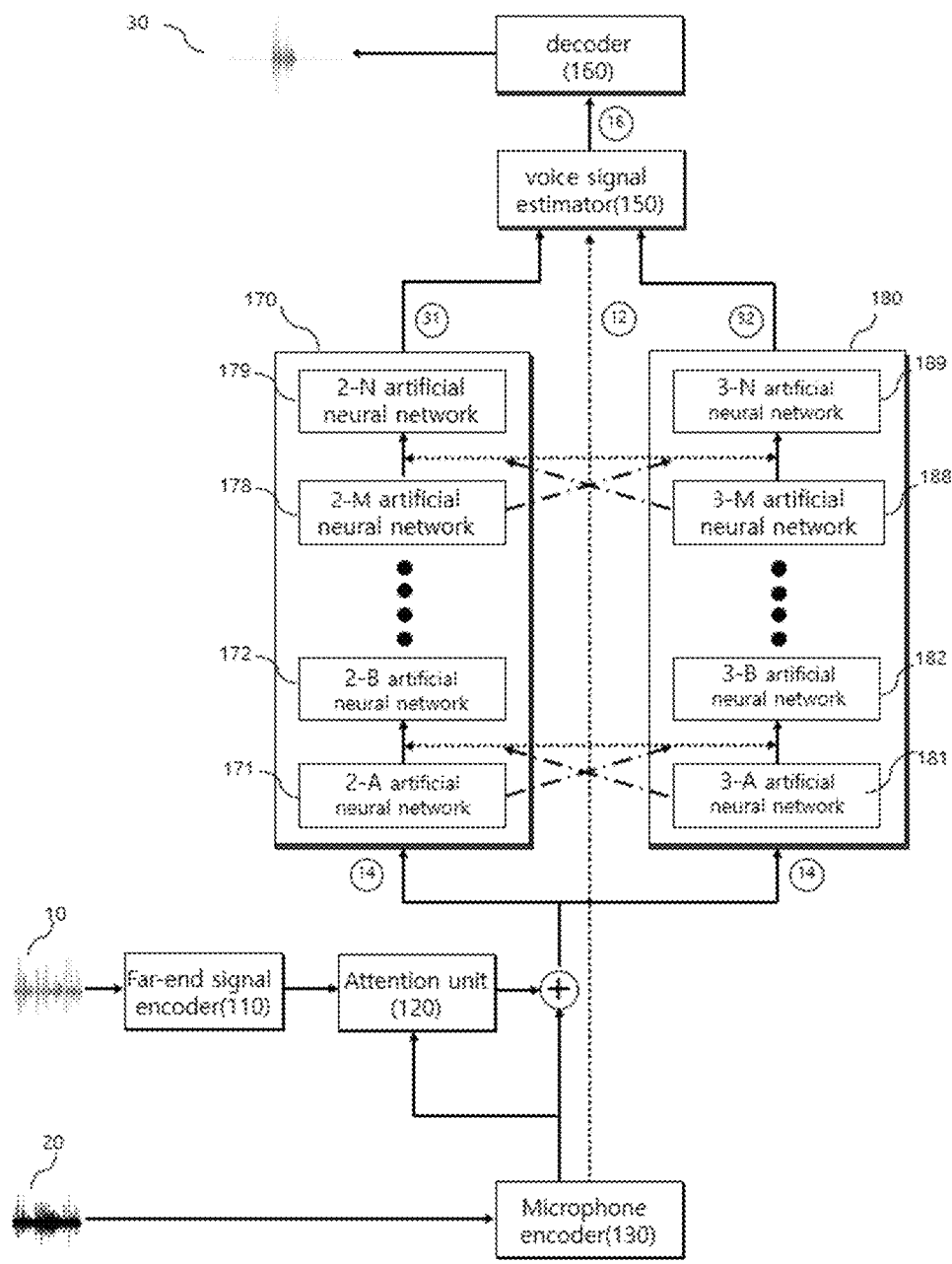

[FIG 9]
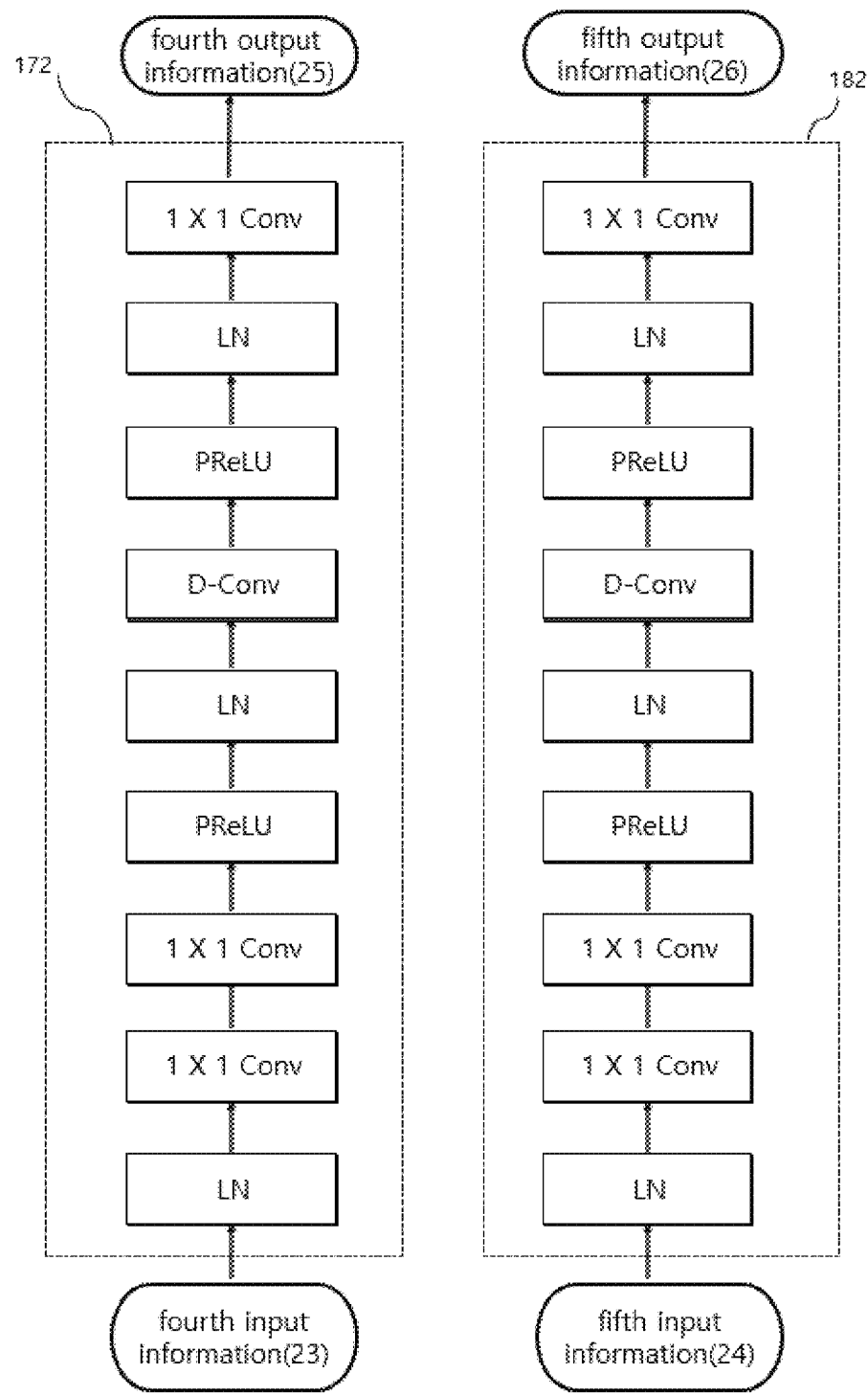

[FIG 10]
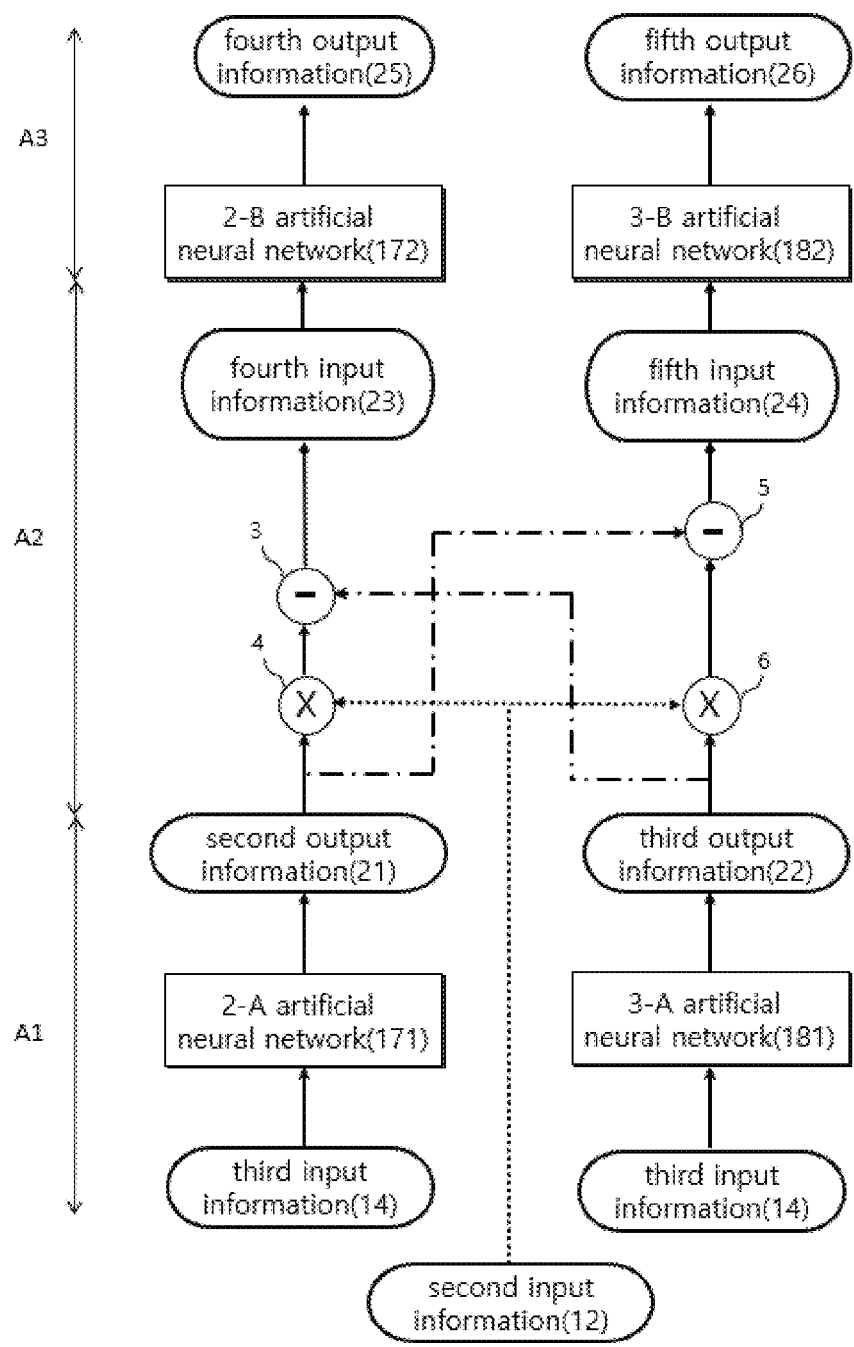

[FIG 11]
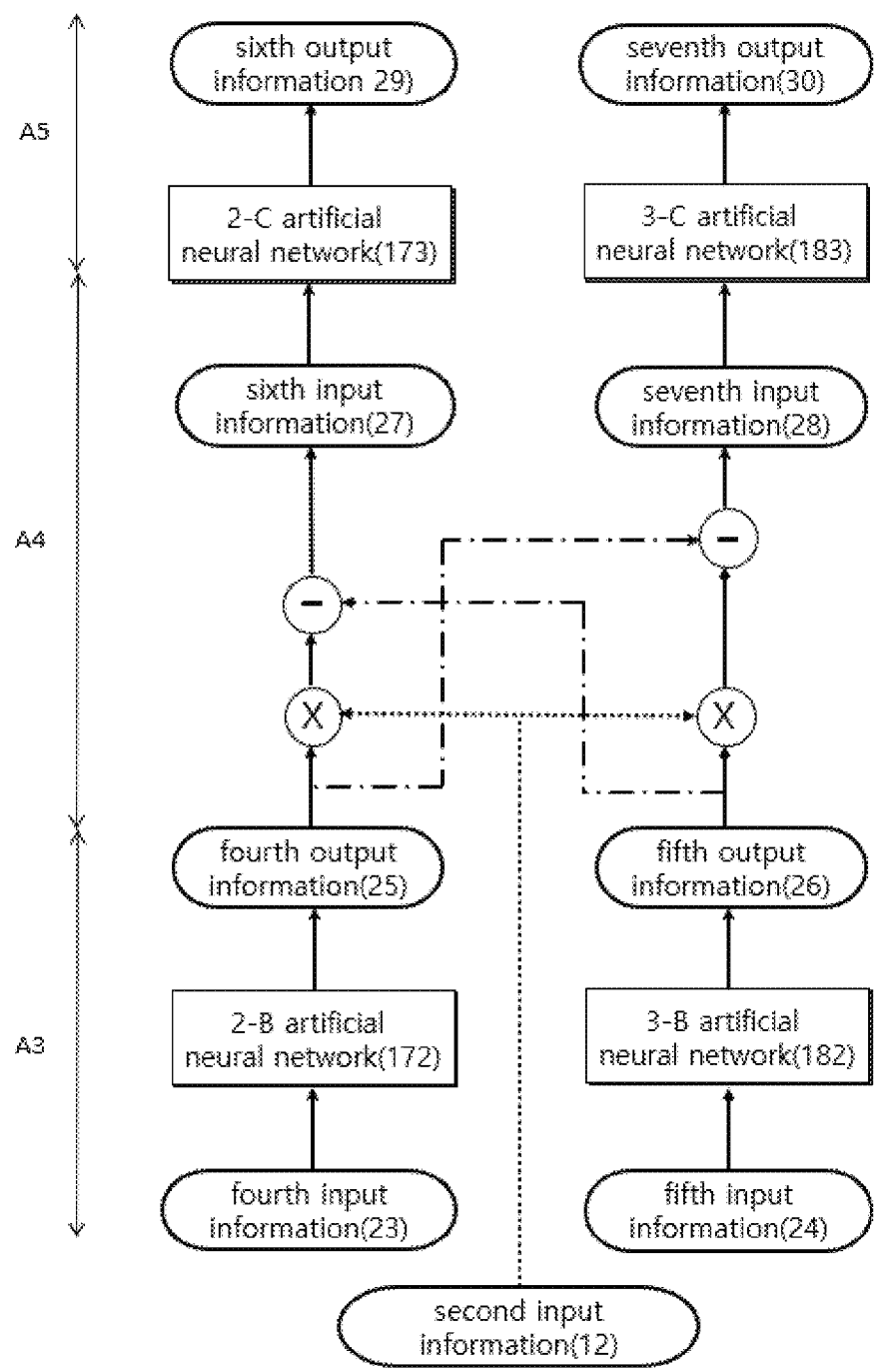

[FIG 12]
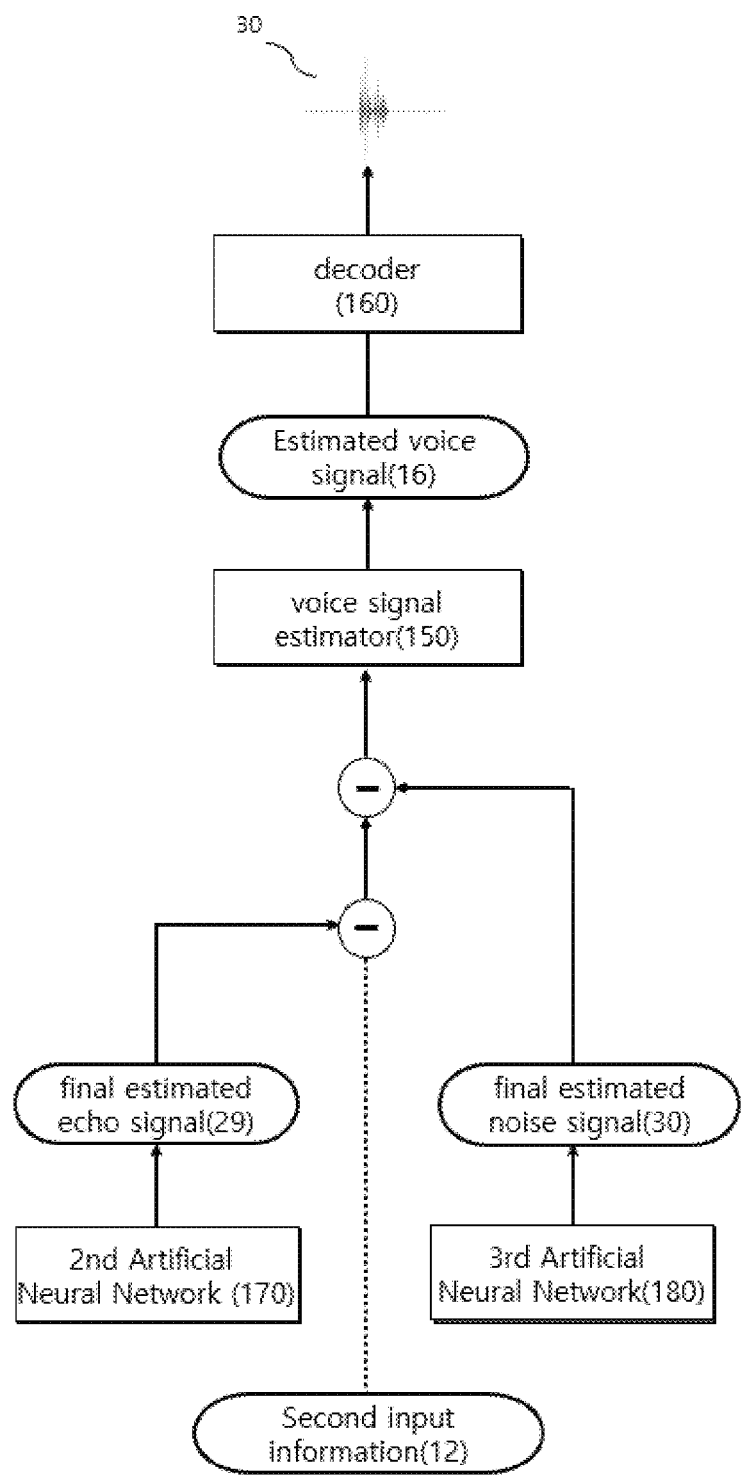

[FIG 13]

| Item | Channel | Model type | PESQ | ERLE | STOI | SDR |
|---|---|---|---|---|---|---|
|  | mic input |  | 1.60 | - | 0.527 | -0.21 |
| 1 | 1 | Stacked-DNN | 1.81 | 24.73 | 0.590 | 4.6 |
| 2 | 1 | CRN | 1.83 | 23.36 | 0.577 | 5.0 |
| 3 | 1 | TCN | 1.77 | 28.21 | 0.653 | 7.5 |
| 4 | 1 | Cross-Tower - Second Embodiment | 2.01 | 29.90 | 0.695 | 8.3 |
| 5 | 1 | Cross-Tower + Attention -Second Embodiment | 1.96 | 29.54 | 0.696 | 8.5 |

[FIG 14]
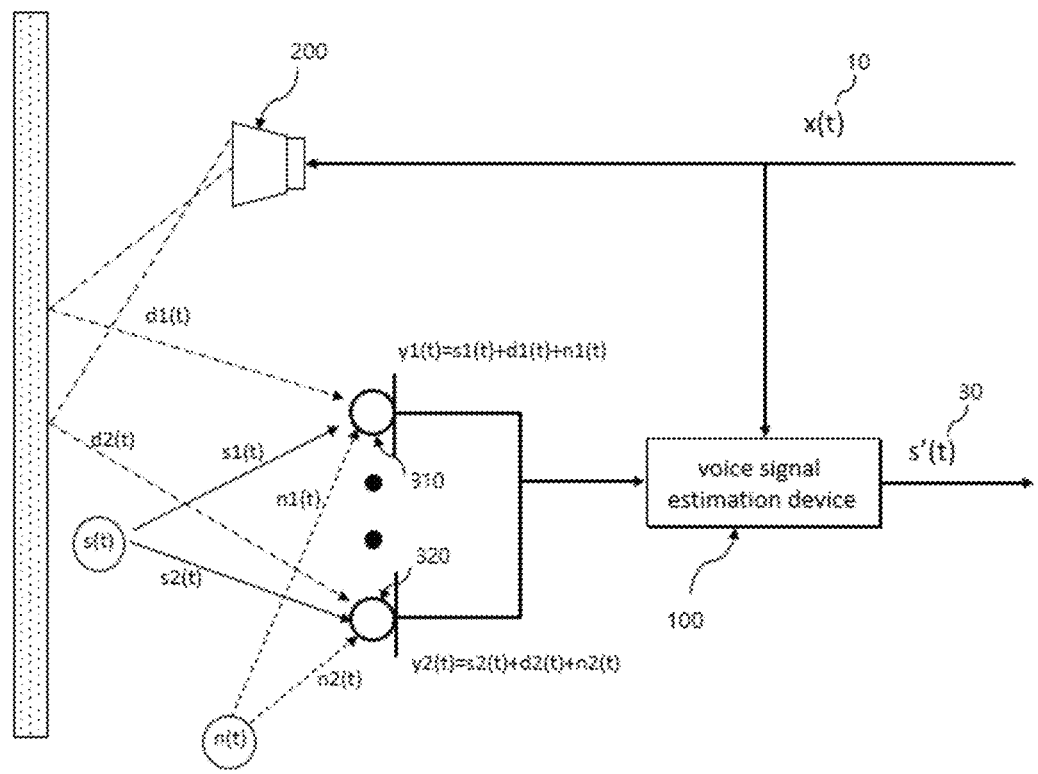

[FIG 15]
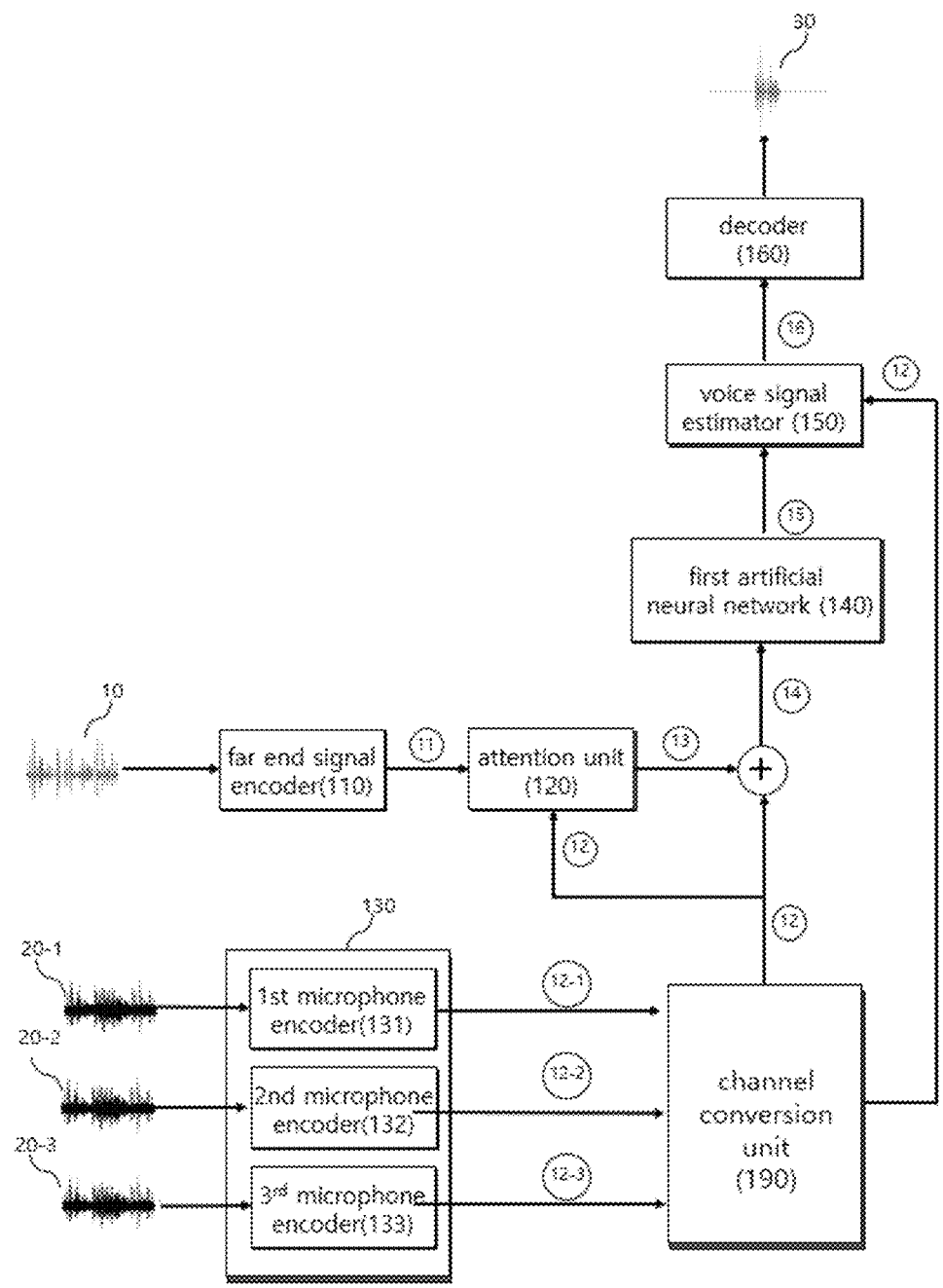

[FIG 16]

| item | channel | model type | PESQ | ERLE | STOI | SDR |
|---|---|---|---|---|---|---|
| | | mic input | 1.60 | - | 0.527 | -0.21 |
| 1 | 1 | Stacked-DNN | 1.81 | 24.73 | 0.590 | 4.6 |
| 2 | 1 | CRN | 1.83 | 23.36 | 0.577 | 5.0 |
| 3 | 1 | TCN + Auxiliary network | 1.77 | 28.21 | 0.653 | 7.5 |
| 4 | 1 | TCN + Auxiliary network +attention (First Embodiment) | 1.87 | 70.80 | 0.682 | 8.0 |
| 5 | 2 | TCN + Auxiliary network +attention (Third Embodiment) | 2.18 | 36.18 | 0.762 | 9.3 |
| 6 | 4 | TCN + Auxiliary network +attention (Third Embodiment) | 2.18 | 40.98 | 0.765 | 9.8 |

[FIG 17]
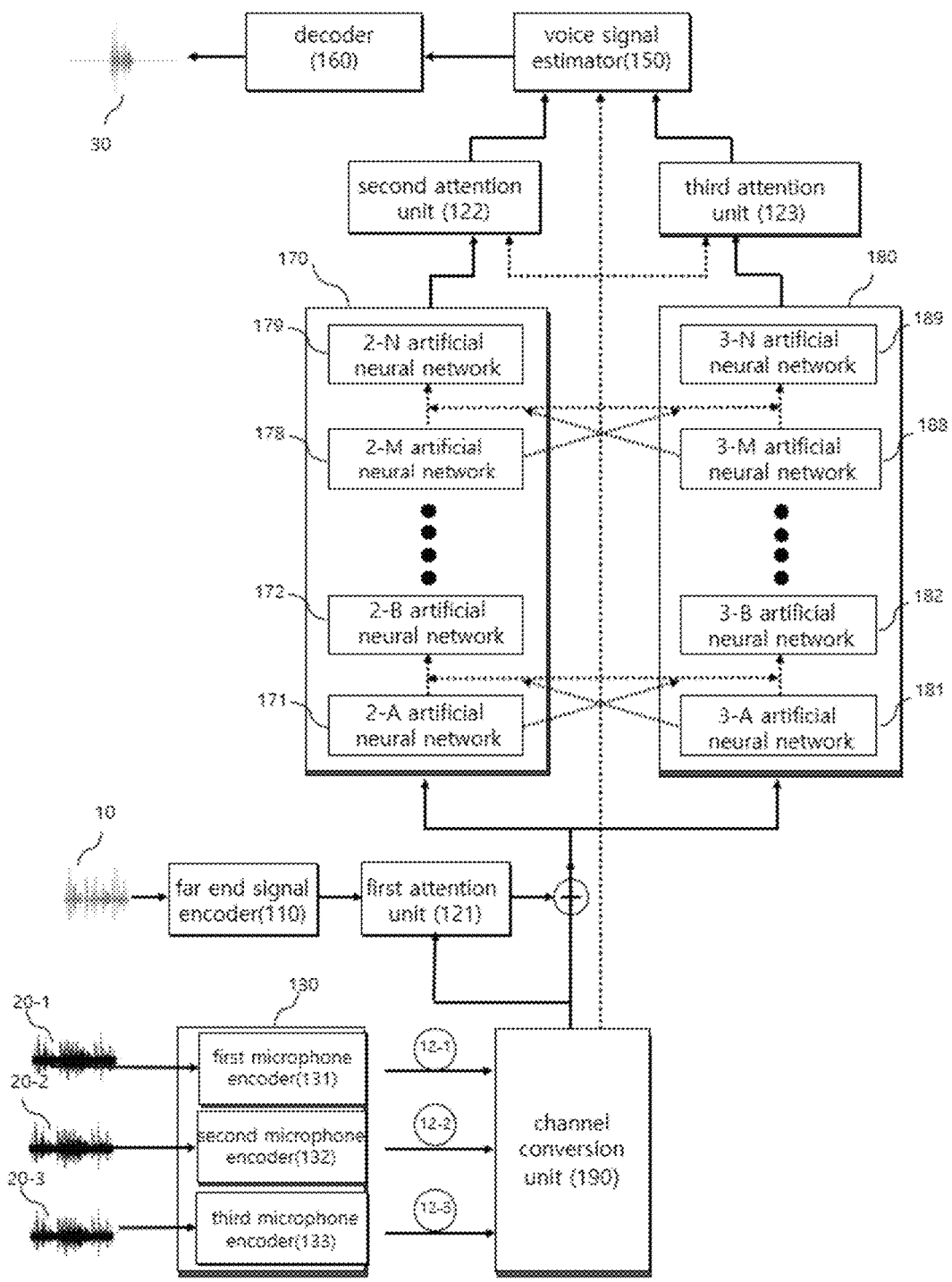

[FIG 18]
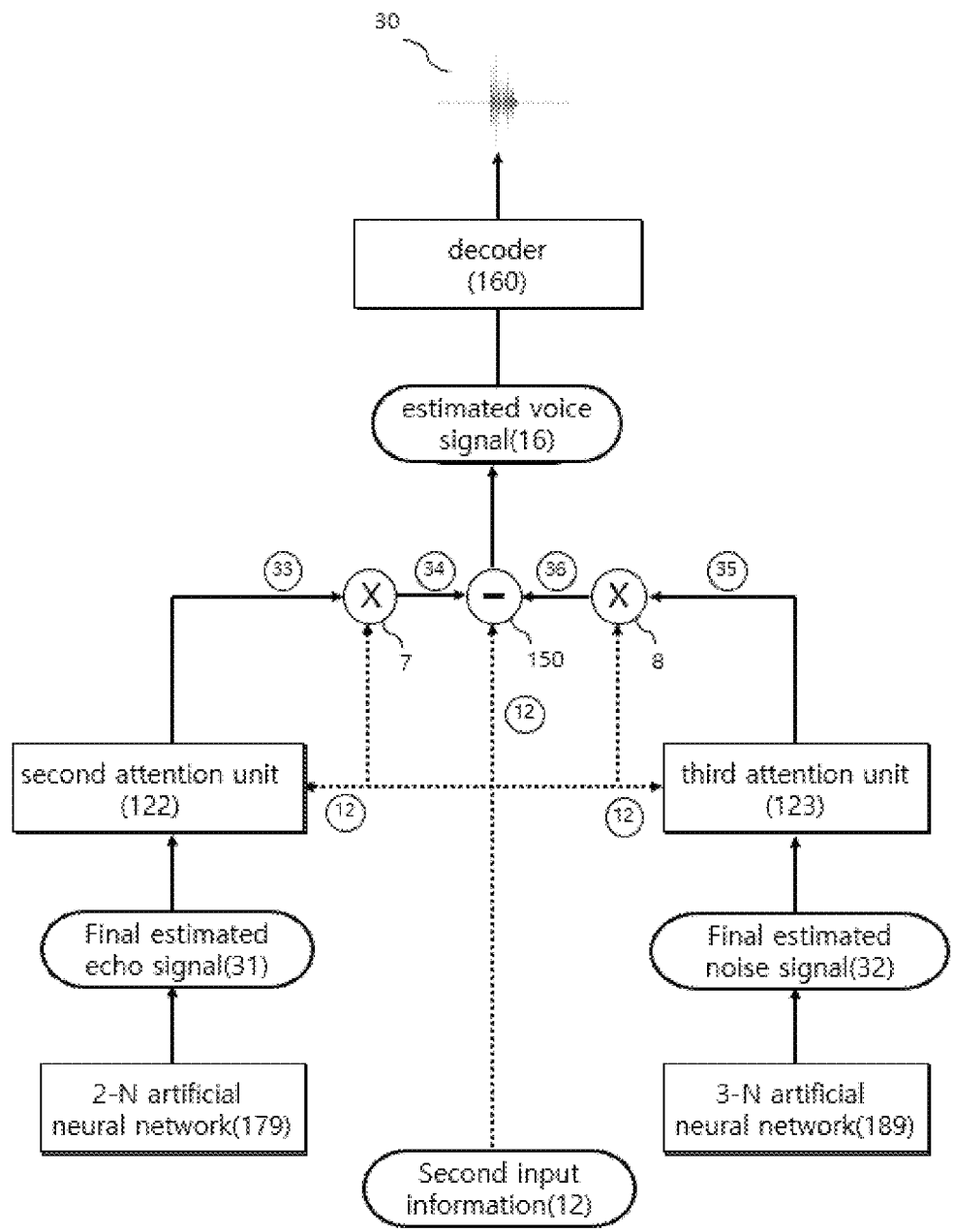

[FIG 19]
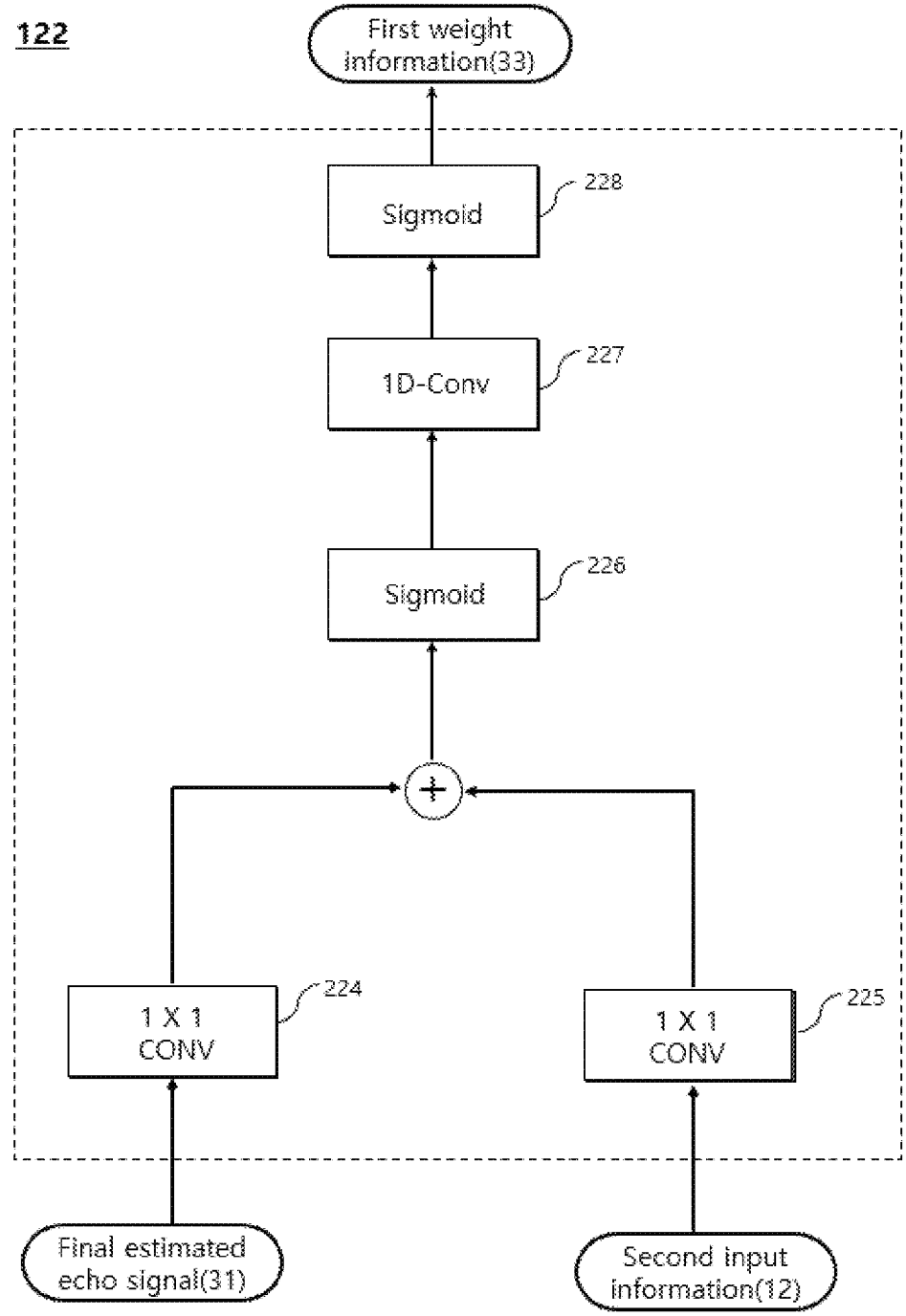

[FIG 20]
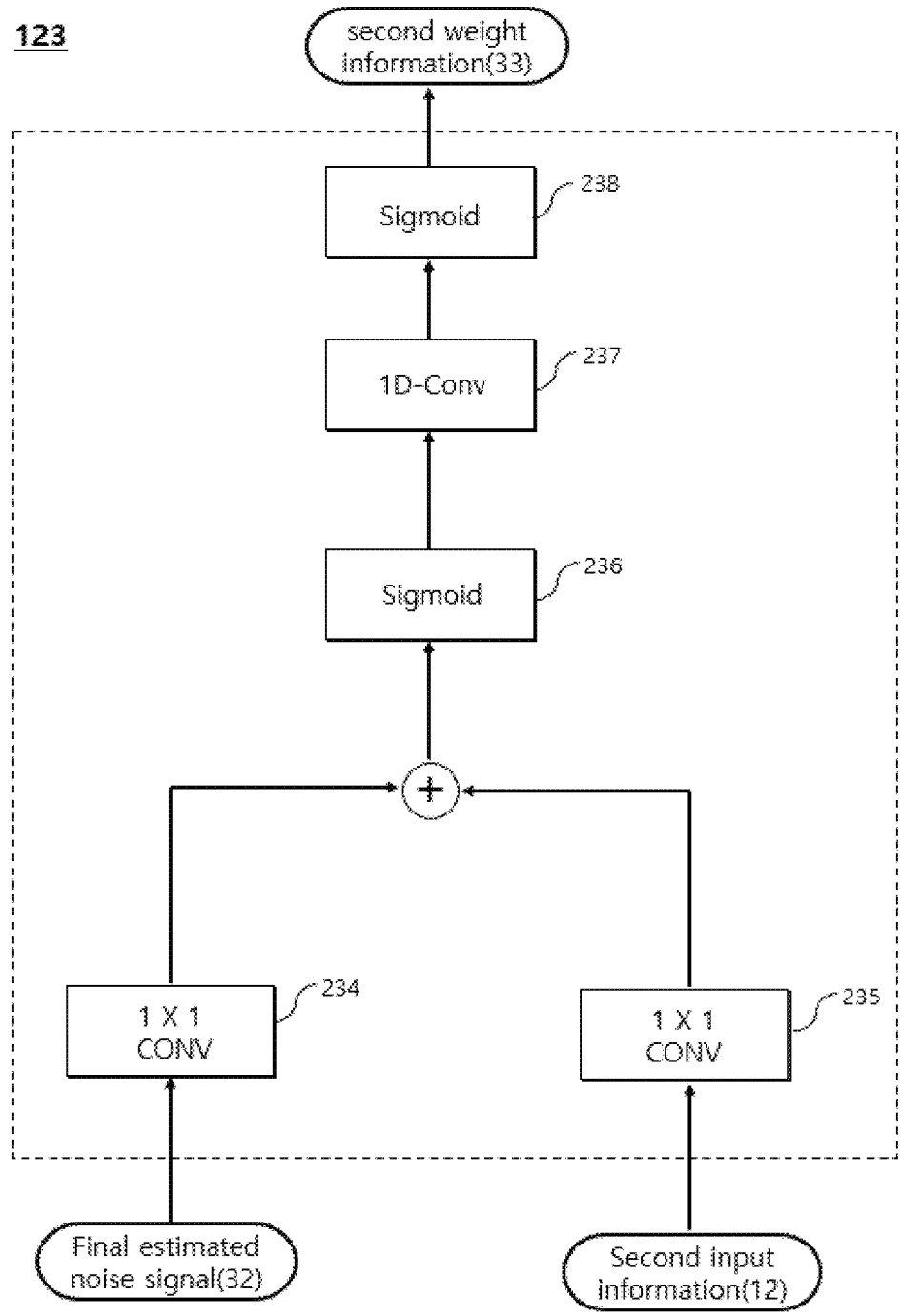

[FIG 21]

| item | channel | model type | PESQ | ERLE | STOI | SDR |
|---|---|---|---|---|---|---|
| | Mic input | | 1.60 | - | 0.527 | -0.21 |
| 1 | 1 | Stacked-DNN | 1.81 | 24.73 | 0.590 | 4.6 |
| 2 | 1 | CRN | 1.83 | 23.36 | 0.577 | 5.0 |
| 3 | 1 | TCN + Auxiliary network | 1.77 | 28.21 | 0.653 | 7.5 |
| 4 | 1 | TCN + Auxiliary network + attention | 1.87 | 30.80 | 0.682 | 8.0 |
| 5 | 1 | Cross-Tower + Auxiliary network + attention 1,2 - Fourth Embodiment | 2.01 | 33.52 | 0.691 | 8.3 |
| 6 | 2 | Cross-Tower + Auxiliary network + attention 1,2 - Fourth Embodiment | 2.43 | 41.09 | 0.801 | 10.41 |
| 7 | 4 | Cross-Tower + Auxiliary network + attention 1,2 - Fourth Embodiment | 2.50 | 45.78 | 0.811 | 11.0 |

LEARNING METHOD FOR INTEGRATED NOISE ECHO CANCELLATION SYSTEM USING CROSS-TOWER NETWORK

CROSS REFERENCE TO RELATED APPLICATIONS

This application is a National Stage of International Application No. PCT/KR2022/001165 filed on Jan. 21, 2022, claiming priority based on Korean Patent Application No. 10-2021-0009001 filed on Jan. 21, 2021.

TECHNICAL FIELD

The present invention relates to a method and apparatus for integrating and canceling noise and echo signals using a deep neural network with a parallel structure. More specifically, the present invention separately estimates a noise signal and an echo signal using a plurality of sequentially connected artificial neural networks, and then removes integrally the noise signal and the echo signal among the signals input to the microphone based on the estimated information.

BACKGROUND ART

Speech communication means a technology that transmits the user's uttered voice to the other party for mutual communication between voice communication users. Specifically, speech communication is used in various fields such as a conference call, a video call, and a video conference as well as a widely used telephone.

In voice communication, only the clear voice signal of the speaker must be delivered in order to deliver accurate meaning to the other party. However, in situations where two or more speakers utter at the same time, or in the case where the previous speaker's utterance is input again into the microphone and playback from the speaker and input from the microphone are repeated, or if noise generated by the surrounding environment is input into the microphone, since only the user's voice is not input into the microphone, there is a problem in that the user's voice is not accurately transmitted to the other party.

Accordingly, recently, technologies for an acoustic echo canceller (AEC) that cancels the echo of sound have been developed in various ways. An acoustic echo canceller can remove acoustic echo, which is a phenomenon in which one's own voice is heard again by directly or indirectly re-inputting the audio signal from the speaker in a video call, video conference, etc. (through reflection from walls or surrounding objects) into the microphone.

For the acoustic echo canceller to efficiently cancel the acoustic echo, it is important to accurately estimate a room impulse response (RIR) path where the acoustic echo is generated. The acoustic echo canceller generally estimates an acoustic echo generation path (RIR) using an adaptive filter and generate an estimated acoustic echo signal. The acoustic echo canceller removes the acoustic echo by subtracting the estimated acoustic echo signal from the actual acoustic echo signal.

Methods for updating the adaptive filter coefficients of the adaptive filter for estimating the acoustic echo generation path (RIR) include a method using a recursive least square (RLS) algorithm, a method using a least mean square (LMS) algorithm, and a method using normalized least mean square (NLMS) algorithm, and a method using the Affine Projection algorithm.

In addition, with the recent development of artificial neural network technology, various technologies for synthesizing voices or recognizing voices using artificial neural networks have been developed. For example, a method of directly estimating the acoustic echo using a deep neural network or a convolutional recurrent neural network in deep learning has been developed.

However, most conventional technologies to date have removed acoustic echoes in the frequency domain by using a convolutional recurrent neural network, which is a type of deep learning technique. When acoustic echo is canceled in the frequency domain, the phase of the input signal is not directly reflected, so echo cancellation is performed by estimating real and imaginary values corresponding to complex values of the phase. Therefore, there is a problem in that the performance of echo cancellation is somewhat deteriorated because it is not a direct phase value of the input signal.

PRIOR ART DOCUMENT

Patent Document (PATENT DOCUMENT 1) KOREAN PATENT REGISTRATION NO. 10-1871604 (PUBLISHED ON Jun. 25, 2018) 'METHOD AND APPARATUS FOR ESTIMATING REVERBERATION TIME BASED ON MULTI-CHANNEL MICROPHONE USING DEEP NEURAL NETWORK'
(PATENT DOCUMENT 2) KOREA PATENT REGISTRATION NO. 10-1988504 (2019.06.05.) 'REINFORCEMENT LEARNING METHOD USING VIRTUAL ENVIRONMENT CREATED BY DEEP LEARNING'

DISCLOSURE

Technical Problem

Therefore, a method and apparatus for integrating and canceling noise and echo signals using a deep neural network with a parallel structure according to an embodiment is an invention designed to solve the above-described problems, and the invention relates to a technique capable of efficiently removing a noise signal and an echo signal among signals by using a noise signal and an echo signal separately estimated to be input to a microphone.

More specifically, purpose of the present invention is to provide a signal estimation device repeatedly and separately estimates a noise signal and an echo signal using a plurality of sequentially connected artificial neural networks, and then accurately extracts only the user's voice information based on the estimated information.

Technical Solution

An integrated noise and echo signal removal device using parallel deep neural network according to an embodiment comprises a microphone encoder that receives a microphone input signal including an echo signal, and a speaker's voice signal, converts the microphone input signal into first input information, and outputs the converted first input information, a far-end signal encoder that receives a far-end signal, converts the far-end signal into second input information, and outputs the converted second input information, a pre-learned second artificial neural network having a third input information, which is the sum of the first input information and the second input information, as input information, and having an estimated echo signal obtained by estimating the echo signal from the second input information as output information, a pre-learned third artificial neural network having the third input information as input information and having an estimated noise signal obtained by estimating the noise signal from the second input information as output information, a voice signal estimator configured to output an estimated voice signal obtained by estimating the voice information based on the estimated echo signal, the estimated noise echo signal, and the second input information.

The integrated noise and echo signal removal device using parallel deep neural network further comprises an attention unit outputting weight information obtained by applying an attention mechanism to the first input information and the second input information, and wherein the third input information further includes the weight information.

The second artificial neural network includes a plurality of artificial neural networks connected in series, and the third artificial neural network includes a plurality of artificial neural networks connected in series on a par with the second artificial neural network, wherein the plurality of artificial neural networks of the second artificial neural network re-estimates the echo signal based on information output from the artificial neural network in the previous step, and wherein the plurality of artificial neural networks of the third artificial neural network re-estimates the noise signal based on the information output from the artificial neural network in the previous step.

The second artificial neural network re-estimates the echo signal using second input information, the estimated echo signal, and the noise signal as input information, wherein the third artificial neural network re-estimates the noise signal using second input information, the estimated echo signal, and the noise signal as input information.

The second artificial neural network includes a 2-A artificial neural network and a 2-B artificial neural network, and the third artificial neural network includes a 3-A artificial neural network and a 3-B artificial neural network, wherein the 2-A artificial neural network includes a pre-learned artificial neural network which takes third input information as input information and second output information including information obtained by estimating the echo signal based on the third input information as output information, and wherein the 3-A artificial neural network includes a pre-learned artificial neural network which takes third input information as input information and third output information including information obtained by estimating the noise signal based on the third input information as output information.

The 2-B artificial neural network includes a pre-learned artificial neural network which mixes the second output information from the second input information and uses fourth input information obtained by subtracting the third output information as input information, and based on the fourth input information, uses fourth output information including information obtained by estimating an echo signal as output information, wherein the 3-B artificial neural network mixes the third output information from the third input information and uses fifth input information obtained by subtracting the second output information as input information, and based on the fifth input information, uses the fifth output information including information estimating the noise signal as output information.

The microphone encoder converts the microphone input signal in the time-domain into a signal in the latent-domain, and the integrated noise and echo signal removal device using parallel deep neural network further comprises a decoder for converting the estimated voice signal in the latent domain into an estimated voice signal in the time domain.

An integrated noise and echo signal removal method using parallel deep neural network according to another embodiment comprises receiving a microphone input signal including an echo signal, and a speaker's voice signal through a microphone encoder, converting the microphone input signal into first input information, and outputting the converted first input information, receiving a far-end signal through a far-end signal encoder, converting the far-end signal into second input information, and outputting the converted second input information, outputting an estimated echo signal through a pre-learned second artificial neural network having third input information, which is the sum of the first input information and the second input information, as input information, and the estimated echo signal obtained by estimating the echo signal as output information, outputting an estimated noise signal through a pre-learned third artificial neural network using the third input information as input information the an estimated noise signal obtained by estimating the noise signal as output information, outputting an estimated speech signal obtained by estimating the speech information based on the estimated echo signal, the estimated noise echo signal, and the second input information.

Advantageous Effects

An integrated noise and echo signal removal device using parallel deep neural network according to an embodiment can increase the accuracy of estimation of the echo signal and the noise signal by iteratively and separately estimating the echo signal and the noise signal, thus more accurately than the prior art. Among the signals input to the microphone, there is an advantage in that an echo signal and a noise signal can be removed.

In addition, there is an advantage in that increasing the accuracy of the estimated echo signal and noise signal by applying an attention mechanism to the estimated echo signal and noise signal information, thereby providing an apparatus for estimating a voice signal capable of more accurately extracting only the user's voice information.

Accordingly, it is possible to more efficiently cancel the echo signal, and there is an effect of improving voice quality and intelligibility in the case of collecting and processing the speaker's voice through a microphone in an environment where echo signals exist, such as artificial intelligence speakers used in home environments, robots used in airports, voice recognition and PC voice communication systems.

BRIEF DESCRIPTION OF DRAWINGS

FIG. 1 is a diagram illustrating various signals input to a voice signal estimation apparatus when a speaker speaks in a single channel environment with one microphone.

FIG. 2 is a block diagram showing some components of an apparatus for estimating a speaker's voice signal according to the first embodiment.

FIG. 3 is a diagram illustrating input information and output information input to the attention unit according to the first embodiment.

FIG. 4 is a diagram for explaining input information input to the first artificial neural network according to the first embodiment.

FIG. 5 is a diagram showing the structure of a first artificial neural network, input information, and output information of a first artificial neural network according to the first embodiment.

FIG. 6 is a diagram showing setting data of an experiment to explain the effect of the present invention.

FIG. 7 is a diagram showing a comparison of output results of other artificial neural network model to explain the effect of the present invention according to the first embodiment.

FIG. 8 is a block diagram showing some components of a voice signal estimation apparatus according to a second embodiment.

FIG. 9 is a diagram for explaining processors of a second artificial neural network and a third artificial neural network according to a second embodiment.

FIG. 10 and FIG. 11 are diagrams showing the relationship between the second artificial neural network and the third artificial neural network according to the second embodiment.

FIG. 12 is a diagram illustrating input information and output information input to a voice signal estimator according to the second embodiment.

FIG. 13 is a diagram showing a comparison of output results with other artificial neural network models in order to explain the effect of the present invention according to the second embodiment.

FIG. 14 is a diagram illustrating various signals input to a voice signal estimation apparatus when a speaker speaks in a multi-channel environment with a plurality of microphones.

FIG. 15 is a block diagram showing some components of a voice signal estimation apparatus according to a third embodiment.

FIG. 16 is a diagram showing a comparison of output results with other artificial neural network models in order to explain the effect of the present invention according to the third embodiment.

FIG. 17 is a block diagram showing some components of a voice signal estimation apparatus according to a fourth embodiment.

FIG. 18 is a diagram for explaining information input to a voice signal estimator according to a fourth embodiment.

FIG. 19 and FIG. 20 are views for explaining the first attention unit and the second attention unit according to the fourth embodiment.

FIG. 21 is a diagram showing comparison of output results with other artificial neural network models to explain the effects of the present invention according to the fourth embodiment.

MODES OF THE INVENTION

Hereinafter, embodiments according to the present invention will be described with reference to the accompanying drawings. In adding reference numerals to the components of each drawing, it should be noted that the same components have the same numerals as much as possible even if they are displayed on different drawings. In addition, in describing an embodiment of the present invention, if it is determined that a detailed description of a related known configuration or function hinders understanding of the embodiment of the present invention, the detailed description thereof will be omitted. In addition, embodiments of the present invention will be described below, but the technical idea of the present invention is not limited or limited thereto and can be modified and implemented in various ways by those skilled in the art.

In addition, terms used in this specification are used to describe embodiments and are not intended to limit and/or limit the disclosed invention. Singular expressions include plural expressions unless the context clearly dictates otherwise.

In this specification, terms such as "include", "comprise" or "have" are intended to designate that there is a feature, number, step, operation, component, part, or combination thereof described in the specification, but one or the existence or addition of more other features, numbers, steps, operations, components, parts, or combinations thereof is not excluded in advance.

In addition, throughout the specification, when a part is said to be "connected" to another part, this is not only the case where it is "directly connected", but also the case where it is "indirectly connected" with another element in the middle. Terms including ordinal numbers, such as "first" and "second" used herein, may be used to describe various components, but the components are not limited by the terms.

Hereinafter, with reference to the accompanying drawings, embodiments of the present invention will be described in detail so that those skilled in the art can easily carry out the present invention. And in order to clearly explain the present invention in the drawings, parts irrelevant to the description are omitted.

The voice enhancement technology is a technology for estimating a clear voice by removing an echo signal input by a microphone and is essential for voice applications such as voice recognition and voice communication. For example, in voice recognition, if a speech recognition model is trained with a clear signal without echo and then tested with a signal with noise, performance is reduced. Therefore, to solve this problem, the performance of voice recognition can be improved by introducing a voice enhancement technology that removes noise and echo before performing voice recognition. In addition, voice enhancement technology can be used to improve call quality by removing echoes from voice communication to deliver clear voice.

Hereinafter, a technique for efficiently estimating a speaker's voice signal included in a microphone input signal using a deep neural network will be described in more detail.

FIG. 1 is a diagram illustrating various signals input to a voice signal estimation apparatus when a speaker speaks in a single channel environment with one microphone.

Referring to FIG. 1, the microphone input signal y (t) 20 input to the microphone 300 can be consist of the sum of s(t) 50 which is voice signal input by the speaker to the microphone 10, n(t) 60 which is a noise signal generated by various environments in the space where the speaker exists, and d(t) 40 which is an echo signal that is obtained by convolving a far end signal output through the speaker 20 and a room impulse response (RIR) between the microphone 10 and the speaker 20 and inputted back to the microphone 300, as shown in Equation (1) below.

$$\mu(t) = s(t) + d(t) + n(t) \qquad \text{Equation (1)}$$

The voice signal estimation apparatus 100 according to the present invention may output a final voice signal 30 obtained by estimating the speaker's voice signal 50 using the microphone input signal 20 and the far-end signal 10. Here, the microphone input signal including noise and echo may mean a microphone input signal in which both noise and echo exist.

FIG. 2 to FIG. 7 are diagrams for explaining the first embodiment of the present invention, FIG. 2 is a block diagram showing some components of an apparatus for estimating a speaker's voice signal according to the first embodiment, FIG. 3 is a diagram illustrating input information and output information input to the attention unit according to the first embodiment, FIG. 4 is a diagram for explaining input information input to the first artificial neural network according to the first embodiment, and FIG. 5 is a diagram showing the structure of a first artificial neural network, input information, and output information of a first artificial neural network according to the first embodiment.

The voice signal estimation apparatus 100 according to the first embodiment of the present invention reflects the characteristics of the first embodiment and may be referred to as a voice signal estimation apparatus using an attention mechanism.

Referring to FIG. 2, the voice signal estimation apparatus 100 according to the first embodiment includes a far-end signal encoder 110, an attention unit 120, a microphone encoder 130, a first artificial neural network 140, and a voice signal estimator 150 and a decoder 160 may be included.

The encoders 110 and 130 serve to convert input signals in the time domain into signals in other domains, and the far-end signal encoder 110 converts the far-end signal 10, which is a signal output from the speaker 200, and the microphone encoder 130 serves to convert the microphone input signal 20 input to the microphone 300.

Specifically, the far-end signal encoder 110 uses the signal output to the speaker 200 as an input signal, and outputs first input information 11 by converting the far-end signal 10 including information in the time domain into a far-end signal in the latent domain. In the case of the latent region, it is not defined as a specific region, for example, a time domain or a frequency domain, and may be defined as a domain of a region generated according to a learning result of an artificial neural network. Therefore, the domain of the latent domain has a characteristic that the domain defined according to the learning environment and results is variable.

The first input information 11 output by the far-end signal encoder 110 is used to extract information about the echo signal 40 in the second input information 12 of the attention unit 120 and the first artificial neural network 140, which will be described later. Specifically, the echo signal 40 is a signal generated by reverberating the far-end signal 10 output from the speaker 200 and has the most similar character to the far-end signal 10 among various types of signals input to the microphone 300. Accordingly, when the information on the echo signal 40 is extracted based on the information on the far-end signal 10, the user's voice signal 50 can be more accurately extracted. A detailed description of this will be described later.

The microphone encoder 130 receives the microphone input signal 20 including the echo signal 40, the voice signal 50, and the noise signal 60 in the time domain from the microphone 300, and outputs the second input information 12 obtained by converting the microphone input signal 20 including information in the time domain into a microphone input signal in the latent domain. The description of the latent region is as described above, but since the first input information 11 and the second input information 12 are added together or used as input information of the same artificial neural network, the domain of the first input information 11 and the domain of the second input information 12 must match each other.

When learning is performed in the domain according to the prior art, information in the input time domain is used for learning using feature information extracted using Short Time Fourier Transform (STFT), whereas, in the case of the present invention, learning is performed using latent features extracted by learning in the latent-domain through processes such as 1D-convolution and ReLu.

Therefore, the far-end signal 10 information in the time domain input to the far-end signal encoder 110 is converted into first input information 11 including information in the latent domain by the far-end signal encoder 110, and the microphone input information 20 in the time domain input through the microphone 300 is converted into second input information 12 in the latent domain by the microphone encoder 130. The first input information 11 and the second input information 12 thus converted are used as input information of the attention unit 120, the first artificial neural network 140, and the decoder 150. And the voice signal 20 input to the microphone encoder 130 may be converted as shown in Equation (2) below.

$$w = H(\mu U) \qquad \text{Equation (2)}$$

The information output by the microphone encoder 130 is output as vector information due to the nature of the encoder. Specifically, in equation (2), y means the microphone input signal 20, and U means a positive value of N×L length, having N vectors according the size of the input information, and H(·) means a nonlinear function.

Among the information input to the first artificial neural network 140, the far-end signal 10 used to remove the echo signal is input to the far-end signal encoder 110 and output to information having vector information as shown in Equation (3) below.

$$w_f = H(xQ) \qquad \text{Equation(3)}$$

In Equation (3), x denotes the far-end signal 10, Q denotes a positive value having N vectors and a length of N×L, and H(·) denotes a nonlinear function.

The first input information 11 and the second input information 12 output in this format may be input to the attention unit 120, converted into weight information 13, and then output. Hereinafter, the mechanism of the attention unit 120 will be described through FIG. 3.

Referring to FIG. 3, the attention unit 130 is a pre-learned artificial neural network having first input information 11 and second input information 120 as input information and weight information 13 as output information. And weight information 13 may mean information about a signal that should be considered more heavily than other signals when estimating a speaker's voice in the first artificial neural network 140.

The attention mechanism has the advantage of a simple structure in the case of the conventional Seq2seq model for estimating the speaker's voice, but since all information is compressed into one fixed-size vector, information loss occurs, and vanishing gradient, a chronic problem of RNNs, and there was a problem that led to a phenomenon in which performance deteriorated significantly when the input data was long.

Therefore, the technology introduced to solve this problem is the attention mechanism. The basic idea of the attention mechanism is that at every time step that predicts the output result from the decoder, refer to the hidden state of the encoder once again to determine the output. That is, which of the input information is more important is not always fixed, but the type of important information changes depending on the time. So, there is an advantage of being able to output information more accurately and quickly by interpreting by giving more weight to important information after figuring out the order of information.

Therefore, the attention unit 120 according to the present invention compares the far-end signal 10 and the microphone input signal 20 input to the attention unit 120, assigns weights to signals having a high correlation. And then information including information about weights is output as output information, and a processor as shown in FIG. 3 can be performed to output this information. As described above, since the echo signal 40 has the highest closeness to the far-end signal 10, the attention unit 120 generates and outputs weight information for the echo signal 40 based on the information about the far-end signal 10 to allow the first artificial neural network 140 to estimate the echo signal 40.

Expressing this as an equation, the first input information 11 and the second input information 12 may be converted as shown in Equations (4) and (5) below.

$$B_{w,w1} = \sigma(L_w + L_{w1}) \qquad \text{Equation (4)}$$

$$M_{encoder_{w,w1}} = \sigma(L_{B_{w,wf}}) \qquad \text{Equation (5)}$$

Here, $\sigma(\cdot)$ means the sigmoid function, w means the latent features of the microphone input signal, Wf is the latent features of the far-end signal, and Lw and Lwf mean the information passed through the 1×1 convolution (111, 112) in FIG. 3.

Referring to FIG. 2, information input to the first artificial neural network 140 is described using the attention mechanism. The attention unit 120 analyzes the first input information 11 output from the far-end signal encoder 110 and the second input information 12 output from the microphone encoder 12 to analyze the correlation between the two pieces of information. Thereafter, the attention unit 120 generates weight information 13 to efficiently estimate the echo signal 40 in estimating the speaker's voice based on the second input information 12 output from the microphone encoder 130 in the first artificial neural network 140. In addition, the generated weight information 13 is input to the first artificial neural network 140 together with the second input information 12.

Referring to FIG. 4 as an example, the second input information 12 includes A, B, and C signal information. As a result of analyzing the correlation between the second input information 12 and the first input information 11 in the attention unit 120, in the case a weight of 0.3 should be assigned to A and no weight should be assigned to B and C, the attention unit 120 outputs the information including this information as the first weight information 13-1, and the first weight information K1 is mixed with first input information 12 at the first point 1 and is converted into second weight information K2. Specifically, since there is no weight information for B and C, B and C is multiplied by 0, and only A is multiplied by 0.3. Therefore, the first weight information 13-1 is converted into the second weight information 13-2 containing only information about 0.3A, and the second weight information is added with the second input information 12 that was originally information at the second point. Therefore, in conclusion, the third input information 14 input to the first artificial neural network 130 is information obtained by modifying the second input information 12 and may include (1.3A+B+C) information above.

The first artificial neural network 140 takes the third input information 14 as input information and second output information 15 including mask information for estimating the speaker's voice signal 50 as output information. The first artificial neural network 140 may include a learning session (not shown) for learning a speaker's voice signal based on the input information and reference information, and an inference session (not shown) estimating the speaker's voice signal based on the input information.

Any neural network that can be borrowed to the first artificial neural network 140 can be included in any neural network that outputs mask information that enables efficient estimation of the speaker's voice, and representatively, as shown in FIG. 5, TCN (Temporal Convolutional Network) artificial neural network may be included.

The TCN artificial neural network sequentially uses 1*1 Cony 141, PReLU 142, LN 143, D-Conv 144, PReLU 145, LN 146 and 1*1 Cony 147 for the third input information 14 input to the neural network, finally, outputs the second output information 15 including mask information for estimating the speaker's voice signal 50 as output information.

The first artificial neural network 140 may perform learning in a direction of reducing loss using the estimated output information and actual reference information. Specifically, learning can be performed in the direction in which the value of the loss function becomes smaller based on the loss function as shown in Equation (6) below.

$$10\log_{10}\left(\frac{\|S_{target}\|^2}{\|S_{target} - \hat{s}\|^2}\right) \qquad \text{Equation 6}$$

In Equation (6), $S_{target}$ denotes the speaker's voice signal, and s˜ denotes information output by the first artificial neural network 140.

Returning to FIG. 2, explaining other components of the voice estimation device 100, the voice signal estimator 150 may estimate the speaker's voice signal based on second output information 15 including mask information estimated by the first artificial neural network 140 and second input information 12 output by the microphone encoder 130.

Specifically, as information output from the first artificial neural network 140, second output information 15 including mask information capable of extracting only the speaker's voice signal from the second input information 12 is output. Accordingly, the voice signal estimator 150 may estimate only the speaker's voice signal from the second input information 12 by using the mask information, and then extract and transmit the estimated voice signal to the decoder 160.

The decoder 160 may output the final voice signal 30 including time domain information based on the estimated voice signal 16 output from the voice signal estimator 150. Specifically, the third output information 15 output by the first artificial neural network 140, the second input information 12 output by the microphone encoder 130, and the estimated voice signal 16 estimated by the voice signal estimator 150 is information about signals estimated in the latent domain, not information in the time domain. Accordingly, the decoder 160 may convert the estimated voice signal 16 of the latent domain finally estimated in the latent domain into the final voice signal 30 in the time domain so that the speaker can recognize the speech.

To explain this using equation, the estimated latent region estimated voice signal 16 can be converted into a form containing information in the time domain with the transposed convolutional layer of Equation (2) described above, like the relationship between the short-time Fourier transform (STFT) and the inverse STFT. For example, it can be expressed as Equation (7) below.

$$\tilde{s} = DV \qquad \text{Equation (7)}$$

Here, $\tilde{s}$ means a voice signal estimated in the time domain, and V means a matrix that converts N vectors into L length.

In the case of a voice estimation method according to the prior art, voice information of a speaker is estimated by estimating mask information based only on a microphone input signal input to a microphone. Therefore, in the case of the prior art, among the information included in the input signal, there was a problem of not distinguishing between information to be weighted and information not to be weighted. Therefore, there is a problem in that it is not possible to efficiently determine the speaker's voice among the signals input to the microphone.

However, the voice signal estimation apparatus 100 according to an embodiment extracts information on the echo signal 40 based on the far-end signal 10 information, and then the extracted information is input information of the first artificial neural network 140, there is an advantage that the first artificial neural network 140 can output mask information obtained by extracting only the user's voice signal 50 more accurately. Furthermore, since information to be weighted using the attention mechanism can be used as input information of the first artificial neural network 130, mask information with higher accuracy can be output.

FIG. 6 is a diagram showing setting data of an experiment to explain the effect of the present invention. FIG. 7 is a diagram showing a comparison of output results of other artificial neural network model to explain the effect of the present invention according to the first embodiment.

Experiments on the experimental result data described in this specification were all conducted using TIMIT, Musan, and MS-SNSD databases (DBs), and all DBs consisted of signals sampled at 16 kHz. For the experiment, the learning dataset consisted of 7,000 utterances and the evaluation dataset consisted of 800 utterances using the noise DB and the DB obtained by convolving the echo signal with the voice signal.

And, to generate voice signals contaminated by noise and echo, RIR was generated by simulating various types of room environments using the RIR generator toolkit that generates RIR in a specific room through simulation.

Specifically, 500 RIRs to be applied to the training dataset and 100 RIRs to be applied to the evaluation dataset were prepared, and the room environment has been set for generating the RIR was randomly selected as shown in FIG. 6 (a).

As the noise signal, ITU-T recommendation P. 501 and MS-SNSD DB were used, noise was randomly added to the speech dataset for evaluation, and the signal-to-echo ratio (SER) at the time of addition was for learning, one of [−6 dB, −3 dB, 0 dB, 3 dB, 6 dB] was selected and randomly added, and the signal-to-noise ratio (SNR) was [0 dB, 4 dB, 8 dB, 12 dB] was selected and randomly added, and the evaluation was one of SER [−4 dB, −2 dB, 0 dB, 2 dB, 4 dB], and the SNR was [3 dB, 6 dB, 9 dB] was selected and randomly added, and FIG. 6 (b) is a diagram showing a room set by such an environment.

For evaluation, the results of 800 utterances were prepared using the utterances included in the evaluation dataset. For more accurate evaluation, perceptual evaluation of speech quality (PESQ), short-time objective intelligibility (STOI), signal to distortion ratio (SDR) and echo return loss enhancement (ERLE) were used, and the score was measured by dividing the section in which voice and echo exist simultaneously and the section in which only echo exists.

PESQ has a score between −0.5 and 4.5, STOI has a score between 0 and 1, SDR and ERLE have no specified value range, and in the case of ERLE, a higher score means better echo removal.

FIG. 7 is a table comparing the experimental results of other artificial neural network models and the artificial neural network model according to the present invention, in the table of FIG. 7, stacked-DNN and CRN refer to a preprocessing algorithm using a central deep neural network in the prior art, and TCN+auxiliary network+attention model in item 4 means the algorithm according to the first embodiment of the present invention.

First, comparing the PESQ and STOI scores that evaluate the degree of voice quality, it can be understood that the algorithm using all deep neural networks improves the voice quality compared to the unprocessed case. In addition, when comparing the scores with the prior art, the method proposed by the present invention shows the highest score, and in all four objective evaluation indicators, the proposed invention according to the present invention has significantly improved scores compared to the prior art.

FIG. 8 to FIG. 12 are views for explaining a second embodiment of the present invention. FIG. 8 is a block diagram showing some components of a voice signal estimation apparatus according to a second embodiment, and FIG. 9 is a diagram for explaining processors of a second artificial neural network and a third artificial neural network according to a second embodiment.

The voice signal estimation apparatus 100 according to the second embodiment of the present invention reflects the characteristics of the second embodiment and may be referred to as an integrated echo and noise cancellation apparatus using a plurality of deep neural networks sequentially.

Referring to FIG. 8, the voice signal estimation apparatus 100 according to the second embodiment includes a far-end signal encoder 110, an attention unit 120, a microphone encoder 130, a voice signal estimator 150, and a decoder 160, the second artificial neural network 170 and the third artificial neural network 180.

Among the audio signal apparatus 100 according to the second embodiment, the far-end signal encoder 110, the attention unit 120, the microphone encoder 130, the voice signal estimator 150, and the decoder 160 are same with the far-end signal encoder 110, the attention unit 120, the microphone encoder 130, the first artificial neural network 140, the voice signal estimator 150, and the decoder 160 described in FIG. 2. So, redundant descriptions are omitted, the second artificial neural network 170 and the third artificial neural network 180, which are components not described in the first embodiment, will be described in detail through the following drawings.

The second artificial neural network 170 and the third artificial neural network 180 according to FIG. 8 are neural networks for estimating an echo signal and a noise signal among signals input to the microphone encoder 130, and the second artificial neural network 170 may be referred to as an echo signal estimation artificial neural network, the third artificial neural network 180 may be referred to as a noise signal estimation artificial neural network, and conversely, the second artificial neural network 170 may be referred to as a noise signal estimation artificial neural network, and the third artificial neural network 180 may be referred to as an echo signal estimation artificial neural network.

Therefore, each artificial neural network of the second artificial neural network 170 and each artificial neural network of the third artificial neural network 180 are neural networks that estimate the echo signal and the noise signal. So, if the artificial neural network can perform this, it may be included in the second artificial neural network 170 and the third artificial neural network 180. And the second artificial neural network 170 and the third artificial neural network 180 may include a Temporal Convolutional Network (TCN) artificial neural network as shown in FIG. 9 as a representative example.

For convenience of explanation, it is assumed that the second artificial neural network 170 is an artificial neural network for estimating an echo signal and the third artificial neural network 180 is an artificial neural network for estimating a noise signal.

As shown in FIG. 8, the second artificial neural network 170 and the third artificial neural network 180 may each include a plurality of (N) artificial neural networks connected in series. Specifically, the second artificial neural network may include the 2-A artificial neural network 171, the 2-B artificial neural network 172 to the 2-M artificial neural network 178, and the 2-N artificial neural network 179, and the third artificial neural network may include the 3-A artificial neural network 181, the 3-B artificial neural network 182 to the 3-M artificial neural network 188, and the 3-N artificial neural network 189.

In FIG. 8, the second artificial neural network 170 and the third artificial neural network 180 are illustrated as including four or more artificial neural networks, but the embodiment of the present invention is not limited thereto, and the number of the second artificial neural network 170 and third artificial neural networks 180 may include various ranges from one to N. However, the plurality of artificial neural networks included in the second artificial neural network 170 and the third artificial neural network 180 have the same structure, so information with the same characteristics (echo signal estimated information or noise signal estimated information) is used as output information.

For example, when the second artificial neural network 170 is an artificial neural network estimating an echo signal, each of the 2-A artificial neural network 171 and the 2-B artificial neural network 172 is an artificial neural network estimating an echo signal. And when the third artificial neural network 180 is an artificial neural network for estimating a noise signal, each of the 3-A artificial neural network 181 and the 3-B artificial neural network 182 is an artificial neural network estimating a noise signal.

The second artificial neural network 170 shown in FIG. 8 is a pre-learned artificial neural network, that uses the third input information 14 as input information and finally estimates the echo signal included in the third input information 14 to obtain a final estimated echo signal 31 as output information. The second artificial neural network 170 includes an inference session (not shown) for estimating the echo signal 40 included in the microphone input signal 20 based on the third input information 14, and a learning session (not shown) performing learning based on reference information on the echo signal, input information and output information.

The third artificial neural network 180 according to FIG. 8 is a pre-learned artificial neural network, that takes the third input information 14 as input information and finally estimates the noise signal included in the third input information 14 to obtain a final estimated noise signal 32 as output information. The third artificial neural network 180 includes an inference session (not shown) for estimating the noise signal 60 included in the microphone input signal 20 based on the third input information 14, and a learning session (not shown) for performing learning based on reference information on the echo signal, input information and output information.

The voice signal estimator 150 according to FIG. 8 removes information about the echo signal from the second input information 13 output from the microphone encoder 130 using the information on the final estimated echo signal 31 output by the second artificial neural network 180. In addition, the voice signal estimator 150 removes noise signal information from the second input information 13 using the final estimated noise signal 32 output from the third artificial neural network 180, and finally generates estimated voice signal 16, and transmits the generated estimated voice signal 16 to the decoder 160. Since the description of the decoder 160 is the same as that described in FIG. 1, it will be omitted.

FIG. 10 and FIG. 11 are diagrams showing the relationship between the second artificial neural network and the third artificial neural network according to the second embodiment.

Referring to FIG. 10, the 2-A artificial neural network 171, which is the first artificial neural network in the second artificial neural network 170, may include a pre-learned artificial neural network using the third input information 13 as input information, and outputting information obtained by primarily estimating the echo signal included in the third input information 13 as the second output information 21.

Similarly, the 3-A artificial neural network 181, which is the first artificial neural network in the third artificial neural network 180, may include a pre-learned artificial neural network using the third input information 13 as input information, and outputting information obtained by primarily estimating the noise signal included in the third input information 13 as the third output information 22.

The 2-B artificial neural network 172 may include a pre-learned artificial neural network that uses the fourth input information 23 generated based on second output information 21 output from the 2-A artificial neural network 171, third output information 22 output from the 3-A artificial neural network 181, and the third input information 14 as input information, and outputs the estimated information by estimating only the echo signal from the fourth input information 23 as the fourth output information 25.

Looking at the information input to the 2-B artificial neural network 172, the second output information 21 output to the 2-A artificial neural network 171 corresponds to the echo signal included in the third input information 14. So, when the second output information 21 is mixed with the third input information 14 at the third point 3, an emphasized signal for the echo signal portion can be generated at the third point 3. Thereafter, the noise signal is removed at the fourth point 4 using the third output information 22 including information about the noise signal with respect to the generated signal to generate fourth input information 23. And the generated the fourth input information 23 is used as input information input to the 2-B artificial neural network 172.

Accordingly, the fourth input information 23 has noise removed from the third input information 14 and the information about the echo signal has more accurate information than the third input information 14. There is an effect that the information on the echo signal output from the 2-B artificial neural network 172 can be output more accurately from the 2-A artificial neural network 171.

Similarly, the 3-B artificial neural network 182 may include a pre-learned artificial neural network that uses the fifth input information 24 generated based on the third output information 22 output by the 3-A artificial neural network 181, the second output information 21 output by the 2-A artificial neural network 171, and the third input information 14 as input information and outputs the information estimated by estimating only the noise signal from the fifth input information 24 as fifth output information 26.

Looking at the information input to the 3-B artificial neural network 182, the third output information 22 output to the 3-A artificial neural network 181 corresponds to the noise signal included in the third input information 14. So, when the third output information 22 is mixed with the third input information 14 at the fifth point 5, an enhanced signal for the noise signal portion can be generated at the fifth point 5.

Thereafter, when the echo signal is removed from the sixth point 6 using the second output information 21 including information about the echo signal, fifth input information 24 is generated, and the fifth input information 24 generated in this way is used as input information input to the 2-C artificial neural network 182.

Accordingly, in the fifth input information 24, the echo is removed from the third input information 14, and information about the noise signal has information that has more accurate information than the third input information 14. Therefore, the fifth input information 24 can be used as input information of the 3-B artificial neural network 182, there is an effect that information on the noise signal output from the 3-B artificial neural network 182 can be output more accurately.

When the number of neural networks of the second artificial neural network 170 and the third artificial neural network 180 is three or more, as shown in FIG. 11, the 2-C artificial neural network 173 can generate the sixth input information 27 according to the principle described above based on the fourth output information 25, the fifth output information 26 and the third input information 14.

The sixth input information 27 thus generated is input as input information to the 2-C artificial neural network 173, and the 2-C artificial neural network 173 generates the sixth output information 29 including estimated information about an echo signal based on the sixth input information 27 as output information.

Similarly, the 3-C artificial neural network 183 can generate the seventh input information 28 by the principle described above based on the fourth output information 25, the fifth output information 26, and the third input information 14. The seventh input information 28 thus generated is input as input information to the 3-C artificial neural network 183, and the 3-C artificial neural network 183 outputs the seventh output information 30 including estimated information about a noise signal based on the seventh input information 28 as output information.

As described above, the number of neural networks of the second artificial neural network 170 and the third artificial neural network 180 can be implemented differently depending on the environment, and the number of the second artificial neural network 170 and the third artificial neural network 180 is one, the second output information 21 becomes the final estimated echo signal 31 of the second artificial neural network 170, and the third output information 22 becomes the third output information 22 becomes final estimated noise signal 32 of the artificial neural network 180 as in FIG. 9. If the number of neural networks of the second artificial neural network 170 and the third artificial neural network 180 is three, the sixth output information 31 may become the final estimated echo signal 28 of the second artificial neural network 170, and the seventh output information 32 may become the final estimated noise signal 31 of the third artificial neural network 180 as in FIG. 10.

In FIG. 8, the attention unit 120 is shown as a component of the voice signal estimation apparatus 100 according to the second embodiment, but the voice signal estimation apparatus 100 according to the second embodiment can be implemented without the attention unit 120. In this case, the third input information 14 becomes the sum of the first input information 11 and the second input information 12.

FIG. 12 is a diagram illustrating input information input to the voice signal estimator 150 according to the second embodiment.

Referring to FIG. 12, the voice signal estimator 150 receives information obtained by removing the final estimated noise signal 32 output from the artificial neural network 180, the final estimated echo signal 31 output from the second artificial neural network 170 from the third input information 14 output from the microphone encoder 130, generates an estimated voice signal 16 by estimating a voice signal based on the received information, and transmits the generated estimated voice signal 16 to the decoder 160.

The decoder 160 may output a voice signal in the time domain based on the estimated audio signal 16 output from the voice signal estimator 150.

Specifically, the decoder 160 may serve to convert the latent region estimated voice signal 16 finally estimated in the latent region into the final voice signal 30 in the time domain so that the speaker can recognize the voice since the final estimated echo signal 31 output to the second artificial neural network 170, the final estimated noise signal 31 output to the third artificial neural network 180, and the third input information 14 output from the microphone encoder 130, and the estimated voice signal 16 estimated by the voice signal estimator 150 is information about signals estimated in the latent domain rather than information in the time domain.

Also, the voice signal estimation apparatus 100 according to the second embodiment may perform learning based on two loss functions. In detail, the voice signal estimation apparatus 100 performs learning by reducing the error of the final voice signal 30 estimated in the time domain or outputs information in the latent domain. And, the voice signal estimation apparatus 100 performs learning by reducing errors in information output by each the second artificial neural network 170 and the third artificial neural network of the artificial neural network 180.

Regarding the first learning method, the voice signal estimation apparatus 100 according to the second embodiment calculates the difference between the final voice signal 30 output from the decoder 160 and the voice signal 50 of the actual speaker and, the difference is defined a first loss function. Thereafter, the voice signal estimation apparatus 100 performs learning by updating at least one of the parameters, in the way the attention unit 120, the second artificial neural network 170, and the third artificial neural network 180 of the voice signal apparatus 100 in a direction in which the value of the first loss function decreases.

Specifically, the voice signal estimation apparatus 100 may perform learning using a loss function such as Equation (8) below.

$$10\log_{10}\left(\frac{\|S_{target}\|^2}{\|S_{target} - \hat{s}\|^2}\right)$$ Equation (8)

In Equation (8), $\|\cdot\|$ denotes $l_2$-norm, $\hat{s}$ denotes the estimated final voice signal, and $s_{target}$ denotes the actual speaker's voice signal.

In the invention disclosed in the first learning method, the voice signal estimation apparatus 100 is viewed as one structure in the time domain and learning is performed. However, the second learning method of the disclosed invention performs learning on each artificial neural network of the second artificial neural network 170 and the third artificial neural network 180 in the latent region.

Specifically, the voice signal estimating apparatus 100 calculates the difference between the information estimated and outputted by each artificial neural network of the second artificial neural network 170 and the third artificial neural network 180 and the actual reference information as a second loss function. And learning can be performed by updating the parameters of each of the artificial neural networks of the second artificial neural network 170 and the third artificial neural network 180 in a direction in which the difference between the values of the second loss function decreases.

Therefore, the second loss function can be defined as the sum of difference between the output information of the n-th artificial neural network of the second artificial neural network 170, output information of the n-th artificial neural network of the third artificial neural network 180, and reference information, therefore. And it can be expressed as Equation (9) below.

$$10 \log_{10}(|d_r - \hat{d}_{r,R}|^2) + 10 \log_{10}(|n_r - \hat{n}_{r,R}|^2) \quad \text{Equation (11)}$$

Here, R means the total number of artificial neural networks constituting the second artificial neural network 170 and the third artificial neural network 180, and dr and nr mean reference information for echo signals in the latent domain and reference information for noise signals.

In performing learning, the voice signal estimation apparatus 100 according to an embodiment may perform learning using only the first loss function described above or may perform learning using only the second loss function and may perform learning using the third loss function which is sum of the first loss function and the second loss function. Therefore, Learning may be performed by updating at least one parameter of the attention unit 120 of the audio signal apparatus 100, the second artificial neural network 170, and the third of the artificial neural network 180 in a direction in which the value of the third loss function decreases. In addition, when learning is performed using the third loss function, learning may be performed using an Equation (12) below as a loss function equation.

$$\frac{-\alpha_s * SDR + (1-\alpha_s)\frac{1}{4}\sum_{P=1}^{R} q^{R-P} LMSE_R}{\alpha_s + (1-\alpha_s)\sum_{P=1}^{R} q^{R-P}} \quad \text{Equation (12)}$$

In Equation 12, even if the number of each artificial neural network in the second artificial neural network 170 and the third artificial neural network 180 increases infinitely, learning can be performed by setting q=1/2, $\alpha_s$=0.7 so as not to exceed the weight of the loss function.

FIG. 13 is a diagram showing a comparison of output results with other artificial neural network models to explain the effect of the present invention according to the second embodiment.

Since the basic conditions for the experimental environment for deriving the experimental results in FIG. 13 are the same as the conditions described in FIG. 6, a description thereof will be omitted and only the experimental results will be compared and described.

Referring to FIG. 13, this is a table comparing the experimental results of other artificial neural network models and the artificial neural network model according to the present invention. In the table, stacked-DNN and CRN refer to preprocessing algorithms using a conventional centralized neural network, and items 3 (Cross Tower) and 4 (Cross-tower+auxiliary network+attention) means the algorithm for the second embodiment of the present invention. Cross-tower means the second artificial neural network 170 and the third artificial neural network 180.

First, comparing the PESQ and STOI scores, which evaluate the degree of voice quality, it appears that the algorithm using all deep neural networks improves voice quality compared to unprocessed. First, comparing the PESQ and STOI scores, which evaluate the degree of voice quality, it appears that the algorithm using all deep neural networks improves voice quality compared to unprocessed. In addition, when comparing the scores with the prior art, the method proposed in the present invention shows the highest score. In all four objective evaluation indicators, it can be seen that the scores are greatly improved compared to the prior art.

FIGS. 14 to 20 are diagrams for explaining an embodiment of the present invention in a multi-channel microphone environment, and FIG. 14 shows various signals input to the voice signal estimation device when a speaker speaks in a multi-channel environment with a plurality of microphones.

In FIG. 14, for convenience of description, an environment in which two microphones 310, 320) are present is described, but the embodiment of the present invention is not applied only to a two-channel environment but can also be applied to a multi-channel environment in which more microphones exist.

Referring to FIG. 14, signals input to the microphones 310 and 320 can be expressed as the sum of a noise signal, an echo signal d(t) reproduced by the speaker 200 and re-entered into the microphones 310 and 320, and a speaker's voice signal s(t). It can be expressed as Equation (13) below.

$$y_i(t) = s_i(t) + d_i(t) + n_i(t) \quad \text{Equation (13)}$$

And d(t) means the echo signal input to the microphones 310 and 320 after the far-end signal is transformed by the nonlinearity in the speaker 200 and the room impulse response (RIR) between the speaker and the microphone, and s(t) means the speaker's voice signal, n means the noise signal, t means the time index, and i means the ith microphone input.

FIG. 15 is a block diagram showing some components of an apparatus for estimating a voice signal according to a third embodiment of the present invention.

The voice signal estimation apparatus 100 according to the third embodiment of the present invention reflects the characteristics of the third embodiment and may be referred to as a multi-channel-based noise and echo signal integrated cancellation apparatus using a deep neural network.

Referring to FIG. 15, the voice signal estimation apparatus 100 according to the third embodiment includes a far-end signal encoder 110, an attention unit 120, a microphone encoder 130 including a plurality of microphone encoders, a channel converter 190, a first artificial neural network 140, a voice signal estimator 150, and a decoder 160.

Since the far-end signal encoder 110, the attention unit 120, the first artificial neural network 140, the voice signal estimator 150, and the decoder 160 described above are the same with the far-end signal encoder 110, the attention unit 120, the first artificial neural network 140, the voice signal estimator 150, and the decoder 160 of the voice signal estimation apparatus 100 according to the third embodiment shown in FIG. 2, duplicate descriptions are omitted. And the plurality of encoders 131, 132, and 133 and the channel conversion unit 190 corresponding to the characteristics of the third embodiment will be described.

The encoder 100 according to the third embodiment is a component that serves to convert signals in the time domain input through the plurality of microphones 300 into signals in the latent domain, respectively. And the number of the encoder 100 may be provided corresponding to the number of the microphones 300. Therefore, the first microphone input signal 20-1 input through the first microphone 310 is input to the first microphone encoder 131, and the second microphone input signal 20-2 input through the second microphone 320 is input to the second microphone encoder 132, and the third microphone input signal 20-2 input through a third microphone (not shown) may be input to the second microphone encoder 132. Although FIG. 15 shows a total of three microphone encoders on the premise that there are three microphones, the embodiment of the present invention is not limited thereto, and more or fewer microphone encoders may be provided depending on the speech environment.

The plurality of microphone encoders 131, 132, and 133 may output converted signals 12-1, 12-2, and 12-3 obtained by converting input signals in the time domain into signals in other domains.

Specifically, the plurality of microphone encoders 131, 132, and 133 respectively receive a plurality of microphone input signals 20-1, 20-2, 20-3 including echo signals, voice signals, and noise signals in the time domain from the microphone 300, and the microphone input signals 20-1, 20-2 and 20-3 including information in the time domain are converted into signals in the latent domain. And the plurality of microphone encoders 131, 132, and 133 output the converted conversion signals 12-1, 12-2, and 12-3.

As described in FIG. 2, the microphone encoder 130 receives a signal in the time domain and converts it into a signal in the latent domain. So, the voice signal 20 input to the microphone encoder 130 can be converted together and it may be converted as shown in Equation (2) below. However, this is an expression in a single-channel microphone environment, and in the case of FIG. 15, since it is a multi-channel environment in which a plurality of microphones exists, the voice signal input to each microphone encoder can be expressed as Equation (14) below.

$$w=H(\mu U) \quad \text{Equation (2)}$$

$$w_i=H(y_{i,k}U_i) \quad \text{Equation (14)}$$

In Equation (14), UI means a positive value of N×L length and has N vectors according to the size of input information, and H(·) means a non-linear function.

However, compared to single-channel, multi-channel microphone input has a larger dimension by the number of microphones, so a component that converts signals output through the microphone encoder 130 to a single-channel level is required to maintain parameters like those of a single channel network and synthesize information at the same dimension as information output through the far-end signal encoder 110. Therefore, in the case of the present invention, the conversion calls 12-1, 12-2, and 12-3 input to the channel conversion unit 190 by the channel conversion unit 190 compress information between channels to form a single channel level after being converted into information, and it can be output as the second input information 12. This process performed by the channel conversion unit 190 can be performed through 1D convolution operation on the input signals and can be expressed as Equation (15) below.

$$w_x=H(\text{concat}[w_1,w_2,\ldots,w_m]U_x) \quad \text{Equation(15)}$$

In Equation (15), Ux means a positive value with a length of N*m×L having N*m vectors.

The second input information 12 output in this format is input to the attention unit 120 together with the first input information 11 output by the far-end signal encoder 110 and is converted into weight information 13 and output. In addition, the weight information 13 is mixed with the second input information 12 and converted into third input information 14, and then input to the first artificial neural network 140 to output mask information for estimating a voice signal. Since this process has been described in detail with reference to FIGS. 2 to 6, it will be omitted.

FIG. 16 is a diagram showing a comparison of output results with other artificial neural network models to explain the effect of the present invention according to the third embodiment.

Since the basic conditions for the experimental environment for deriving the experimental results in FIG. 16 are the same as the conditions described in FIG. 6, a description thereof will be omitted and only the experimental results will be compared and described.

Referring to FIG. 16, this is a table comparing the experimental results of other artificial neural network models and the artificial neural network model according to the present invention. In the table, stacked-DNN and CRN refer to preprocessing algorithms using the prior art centralized neural network, items 4 to 6 are the artificial neural network model according to the present invention, item 4 is the model according to the first embodiment, and items 5 and 6 are the model according to the third embodiment.

First, comparing the PESQ and STOI scores, which evaluate the degree of voice quality, the algorithm using all deep neural networks improved the voice quality compared to the unprocessed case, and the STOI and SDR are also better than the conventional technologies. In addition, comparing items 4 to 6, it can be seen that the quality of all items increases when a channel conversion unit is added according to the present invention while being extended to multi-channel.

FIG. 17 is a block diagram showing some components of a voice signal estimation apparatus according to a fourth embodiment, and FIGS. 18 and 19 are diagrams for explaining information input to a voice signal estimator according to a fourth embodiment.

Referring to FIG. 17, the voice signal estimation apparatus 100 according to the fourth embodiment includes a far-end signal encoder 110, a first attention unit 121, a second attention unit 122, and a third attention unit 123, a microphone encoder 130 including a plurality of microphone encoders 131, 132, and 133, a second artificial neural network 170, a third artificial neural network 180, a channel converter 190, and a voice signal estimator 150 and a decoder 160.

Among the voice signal estimation apparatus 100 according to the fourth embodiment, the far-end signal encoder 110, the first microphone encoder 131, the second microphone encoder 132, the third microphone encoder 133, and the channel converter 190 is the same as the far-end signal encoder 110, the first microphone encoder 131, the second microphone encoder 132, the third microphone encoder 133, and the channel converter 190 described in FIG. 15, and the first attention unit 121 is the same as the attention unit 120 of FIG. 1, and the second artificial neural network 170 and the third artificial neural network 180 are the same as second artificial neural network 170 and the third artificial neural network 180 of FIG. 8, so the overlapping description will be omitted below.

The voice signal estimation apparatus 100 according to the fourth embodiment is based on the audio signal device 100 according to the second embodiment utilizing a plurality of artificial neural networks 120 and 130 and the multi-channel-based audio signal device 100. When compared with other embodiments, the difference is that the second attention unit 122 and the third attention unit 123 are used for the information output to the second artificial neural network 170 and the third artificial neural network 180.

If the final estimated echo signal 31 and the final estimated noise signal 32 respectively estimated by the second artificial neural network 170 and the third artificial neural network 180 are simply removed from the compressed mixture, there is a possibility that the possibility of voice distortion increases. Therefore, voice signal estimation apparatus 100 according to the fourth embodiment applies an attention mechanism between the final estimated echo signal 31 and the second input information 12 to prevent such speech distortion, and at the same time, a voice signal can be more accurately extracted by applying an attention mechanism between the final estimated noise signal 32 and the second input information 12.

That is, like the principle described in the attention unit 120 in FIG. 2 above, the second attention unit 122 analyzes the correlation between the second input information 12 and the echo signal and generates first weight information 33 including information on latent features having a high correlation with the echo signal. Thereafter, the third attention unit 123 analyzes the correlation between the second input information 12 and the noise signal and generates weight information (35) including information about latent features having a high correlation with the noise signal. Then, the third attention unit 123 outputs the estimated voice signal 16 by utilizing the generated weight information 34 and 35 and the second input information 12.

Looking at this through equations and FIGS. 19 and 20, the second attention unit 122 receives the second input information 12 and the final estimated echo signal 31 output from the second artificial neural network 170 as shown in FIG. 19. Thereafter, the final estimated echo signal 31 and the first input information are combined after 1×1 Cony (224, 225) is applied, respectively, and then a sigmoid 226 function is applied to be converted as shown in Equation (16) below.

$$B_{w_x, \hat{d}_R} = \sigma(L_{w_x} + L_{\hat{d}_r}) = d \qquad \text{Equation (16)}$$

As shown in FIG. 20, the third attention unit 123 also receives the final estimated noise signal 32 output from the third artificial neural network 180 and the second input information 12, respectively, and the final estimated noise signal 32 and the first input information are combined after 1×1 Cony (234, 235) is applied, respectively, and then a sigmoid 236 function is applied to be converted as shown in Equation (17) below.

$$B_{w_x, \hat{n}_R} = \sigma(L_{w_x} + L_{\hat{n}_R}) = n \qquad \text{Equation (17)}$$

In Equations (16) and (17), $\sigma(\cdot)$ denotes the sigmoid function, $w_x$ denotes the latent features of the second input signal 12, and $\hat{d}_{nR}$, $\hat{n}_{rR}$ denotes the output information of the Rth artificial neural network of the second artificial neural network 170 and the third artificial neural network 180, and L denotes that the 1×1 convolution function is applied.

The information output according to Equation (16) is output after converted into first weight information 33 related to the echo signal by applying the 1D-Conv 227 and the sigmoid function 228, as shown in FIG. and can be expressed as Equation (18) below.

$$M_{mix-echo} = \sigma(L_d) \qquad \text{Equation (18)}$$

The information output according to Equation (17) is output after converted into first weight information 34 related to the noise signal by applying the 1D-Conv 237 and the sigmoid function 238 again as shown in FIG. 20 and can be expressed as Equation (19) below.

$$M_{mix-noise} = \sigma(L_n) \qquad \text{Equation (19)}$$

The first weight information 33 is mixed with the second input information 12 at the seventh point 7 and converted into first mixed information 31, and the second weight information 34 is mixed with the second input information 12 at the eighth point 8 and converted into second mixed information 32. Thereafter, at the ninth point 9, the first mixed information 31 and the second mixed information 32 are removed from the second input information 12, and only the remaining information is input to the voice signal estimator 150 and the estimated voice signal 16 is output and can be expressed as Equation (20) below.

$$D = w_x - w_x M_{mix-echo} - w_x M_{mix-noise} \qquad \text{Equation (20)}$$

The estimated latent domain estimated voice signal 16 can be converted into a form containing information in the time domain with the transposed convolutional layer of Equation (2) described above, like the relationship between the short-time Fourier transform (STFT) and inverse STFT, and it can be expressed as Equation (7) below.

$$\tilde{s} = DV \qquad \text{Equation (7)}$$

Here, $\tilde{s}$ denotes a voice signal estimated in the time domain, and V denotes a matrix that converts N vectors into L length.

In addition, the voice signal estimation apparatus 100 according to the third embodiment may perform learning based on two loss functions, and specifically, learning is performed by reducing the error of the final voice signal 30 estimated in the time domain. Also, learning can be performed in the way for reducing an error in information output by each of the second artificial neural network 170 and the third artificial neural network 180 outputting information estimated in the latent region for the echo signal and the noise signal.

In the case of the first learning method, learning may be performed by updating at least one parameter of the attention unit 120, the second artificial neural network 170, and the third artificial neural network 180 of the audio signal device 100 in the direction in which the value of the first loss function decreases, by defining the difference between the final voice signal 30 output from the decoder 160 and the voice signal 50 of the actual speaker as the first loss function.

The second learning method is a method of performing learning on each of the artificial neural networks of the second artificial neural network 170 and the third artificial neural network 180 in the latent domain. Specifically, the second learning method defines a difference between information estimated and outputted by each artificial neural network of the second artificial neural network 170 and the third artificial neural network 180 and actual reference information as a second loss function. Thereafter, the second learning method is a method of updating the parameters of each of the artificial neural networks of the second artificial neural network 170 and the third artificial neural network 180 in a direction in which the difference in the value of the second loss function becomes small. Therefore, the second loss function can be defined as the sum of the differences between output information of the n-th artificial neural network of the second artificial neural network 170 and reference information therefor, and output information of the n-th artificial neural network of the third artificial neural network 180 and reference information therefor and it can be expressed as Equation (9) below.

In addition, in performing learning, the voice signal estimation apparatus 100 according to the fourth embodiment may perform learning using only the first loss function described above, only the second loss function, or the third loss function obtained by adding the first loss function and the second loss function. In addition, the voice signal estimation apparatus 100 according to the fourth embodiment uses a third loss function obtained by adding the first loss function and the second loss function to a direction in which the value of the third loss function decreases. And learning may be performed by updating at least one parameter of the attention unit 120, the second artificial neural network 170, and the third artificial neural network 180 of the voice signal estimation apparatus 100.

In the case of the method for learning the artificial neural network using the first loss function, the second loss function, and the third loss function, the voice signal estimation apparatus 100 according to the second embodiment has been described in detail while explaining, a detailed description thereof will be omitted.

FIG. 19 is a diagram showing a comparison of output results with other artificial neural network models to explain the effect of the present invention according to the fourth embodiment.

Referring to FIG. 19, this is a table comparing the experimental results of other artificial neural network models and the artificial neural network model according to the present invention, items 5 to 7 As an artificial neural network model according to the fourth embodiment of the present invention, attention 1 refers to the first attention unit, and attention 2 and 3 refer to the second attention unit and the third attention unit. In addition, items 5 to 7 differ from the model according to the fourth embodiment in that the number of microphone inputs is increased.

First, comparing the PESQ and STOI scores, which evaluate the degree of voice quality, the algorithm using all deep neural networks improved the voice quality compared to the unprocessed case, and the STOI and SDR are also better than the conventional technologies. In addition, comparing items 5 to 7, the quality of all items increases as the number of channels increases when the attention part has up to the third attention according to the fourth embodiment.

An apparatus for integrating and canceling noise and echo signals based on multi-channels using a deep neural network according to an embodiment can increase the accuracy of estimation of the echo signal and the noise signal by iteratively and separately estimating the echo signal and the noise signal. Among the signals accurately input to the microphone, there is an advantage in that echo signals and noise signals can be removed.

In addition, the present invention provides an apparatus for estimating a voice signal capable of more accurately extracting only user's voice information because the accuracy of the estimated echo signal and noise signal by applying an attention mechanism to the estimated echo signal and noise signal information.

Therefore, in the case of collecting and processing the speaker's voice through a microphone in an environment where echo signals exist, such as artificial intelligence speakers used in home environments, robots used in airports, voice recognition and PC voice communication systems, etc., echo signals are more efficiently processed, there is an effect of improving voice quality and intelligibility.

As described above, the embodiments can derive better performance by removing noise and echo before performing voice recognition and voice communication technology as a voice enhancement technology and can be applied to improve voice call quality in a mobile phone terminal or voice talk. In addition, recently, voice recognition is performed in various Internet of Things (IoT) devices, which can be performed not only in a quiet environment but also in an environment with ambient noise. Therefore, sound can re-enter and create an echo. Therefore, the performance of voice recognition performed by IoT devices can be improved by removing noise and echo before performing voice recognition. In addition, since the present embodiments provide a voice enhancement signal of excellent quality, they can be applied to various voice communication technologies to provide a clear voice quality.

The devices described above may be implemented as hardware components, software components, and/or a combination of hardware components and software components. For example, devices and components described in the embodiments may include, for example, a processor, a controller, an arithmetic logic unit (ALU), a digital signal processor, a microcomputer, a field programmable array (FPA), It may be implemented using one or more general purpose or special purpose computers, such as a programmable logic unit (PLU), microprocessor, or any other device capable of executing and responding to instructions. The processing device may run an operating system (OS) and one or more software applications running on the operating system. A processing device may also access, store, manipulate, process, and generate data in response to execution of software. For convenience of understanding, there are cases in which one processing device is used, but those skilled in the art will understand that the processing device includes a plurality of processing elements and/or a plurality of types of processing elements. For example, a processing device may include a plurality of processors or a processor and a controller. Other processing configurations are also possible, such as parallel processors.

Software may include a computer program, code, instructions, or a combination of one or more of the foregoing, and software may independently or collectively configure a processing device to operate as desired and can command the processing unit. Software and/or data may be embodied in any tangible machine, component, physical device, virtual equipment, computer storage medium or device, intended to be interpreted by or provide instructions or data to a processing device. Software may be distributed on networked computer systems and stored or executed in a distributed manner. Software and data may be stored on one or more computer readable media.

The method according to the embodiment may be implemented in the form of program instructions that can be executed through various computer means and recorded on a computer readable medium. The computer readable medium may include program instructions, data files, data structures, etc. alone or in combination. Program commands recorded on the medium may be specially designed and configured for the embodiment or may be known and usable to those skilled in computer software. Examples of computer-readable recording media include magnetic media such as hard disks, floppy disks and magnetic tapes, optical media such as CD-ROMs and DVDs, and magnetic media such as floptical disks.—includes hardware devices specially configured to store and execute program instructions, such as magneto-optical media, and ROM, RAM, flash memory, and the like. Examples of program instructions include high-level language codes that can be executed by a computer using an interpreter, as well as machine language codes such as those produced by a compiler.

As described above, although the embodiments have been described with limited examples and drawings, those skilled in the art can make various modifications and variations from the above description. For example, the described techniques may be performed in an order different from the method described, and/or components of the described system, structure, device, circuit, etc. may be combined or combined in a different form than the method described, or other components may be used. Or even if it is replaced or substituted by equivalents, appropriate results can be achieved. Therefore, other implementations, other embodiments, and equivalents of the claims are within the scope of the following claims.

EXPLANATION OF NUMBER

100; acoustic signal estimation device
110; far-end signal encoder
120; attention unit
121; first attention unit
122; second attention unit
123; third attention unit
130; microphone encoder
131; first microphone encoder
132; second microphone encoder
133; third microphone encoder
140; first artificial neural network
150; voice signal estimator
160; decoder
170; first artificial neural network
180; second artificial neural network
190; channel conversion unit
200; speaker
300; microphone

The invention claimed is:

1. An integrated noise and echo signal removal device using parallel deep neural network comprising:
   a microphone encoder configured to receive a time-domain microphone input signal including an echo signal, and a speaker's voice signal, convert the time-domain microphone input signal into first input information in a latent-domain, and output the converted first input information;
   a far-end signal encoder configured to receive a time-domain far-end signal, convert the time-domain far-end signal into second input information in the latent-domain, and output the converted second input information;
   a pre-learned second artificial neural network and a pre-learned third artificial neural network, wherein: the pre-learned second artificial neural network is configured to estimate an echo signal, the pre-learned third artificial neural network is configured to estimate a noise signal, the pre-learned second artificial neural network and the pre-learned third artificial neural network operate in parallel, and each of the pre-learned second artificial neural network and the pre-learned third artificial neural network is configured to re-estimate its respective signal based on subtracting an estimate generated by the other network; and
   a voice signal estimator configured to output an estimated voice signal obtained by estimating the voice information based on the estimated echo signal, the estimated noise signal, and the far-end signal,
   wherein the integrated noise and echo signal removal device further comprises a decoder configured to convert the estimated voice signal in the latent domain into an estimated voice signal in a time-domain.

2. The integrated noise and echo signal removal device using parallel deep neural network according to claim 1, further comprising an attention unit configured to output weight information obtained by applying an attention mechanism to the first input information and the second input information, and
   wherein the third input information further includes the weight information.

3. The integrated noise and echo signal removal device using parallel deep neural network according to claim 1, wherein the pre-learned second artificial neural network includes a plurality of artificial neural networks connected in series, and the pre-learned third artificial neural network includes a plurality of artificial neural networks connected in series on a parallel with the pre-learned second artificial neural network,
   wherein the plurality of artificial neural networks of the pre-learned second artificial neural network are further configured to re-estimate the echo signal based on information output from an artificial neural network in the previous step, and
   wherein the plurality of artificial neural networks of the third artificial neural network are further configured to re-estimate the noise signal based on the information output from the artificial neural network in the previous step.

4. The integrated noise and echo signal removal device using parallel deep neural network according to claim 3, wherein the pre-learned second artificial neural network is configured to re-estimate the echo signal using second input information, the estimated echo signal, and the noise signal as input information, and
   wherein the pre-learned third artificial neural network is configured to re-estimate the noise signal using second input information, the estimated echo signal, and the noise signal as input information.

5. The integrated noise and echo signal removal device using parallel deep neural network according to claim 3, wherein the pre-learned second artificial neural network includes a 2-A artificial neural network and a 2-B artificial neural network, and the third artificial neural network includes a 3-A artificial neural network and a 3-B artificial neural network,
   wherein the 2-A artificial neural network includes a pre-learned artificial neural network which takes third input information as input information and second output information including information obtained by estimating the echo signal based on the third input information as output information, and wherein the 3-A artificial neural network includes a pre-learned artificial neural network which takes third input information as input information and third output information including information obtained by estimating the noise signal based on the third input information as output information.

6. The integrated noise and echo signal removal device using parallel deep neural network according to claim 5, wherein the 2-B artificial neural network includes a pre-learned artificial neural network which mixes the second output information from the second input information and uses fourth input information obtained by subtracting the third output information as input information, and based on the fourth input information, uses fourth output information including information obtained by estimating the echo signal as output information, and wherein the 3-B artificial neural network mixes the third output information from the third input information and uses fifth input information obtained by subtracting the second output information as input information, and based on the fifth input information, uses the fifth output information including information estimating the noise signal as output information.

* * * * *